United States Patent
Cajiga et al.

(10) Patent No.: US 9,181,078 B2
(45) Date of Patent: *Nov. 10, 2015

(54) MOBILE FUEL DISTRIBUTION SYSTEM

(76) Inventors: Jose A. Cajiga, Keybiscayne, FL (US);
Arturo Cajiga Villar, Keybiscayne, FL (US); Vicente Cajiga Villar, Keybiscayne, FL (US)

( * ) Notice: Subject to any disclaimer, the term of this patent is extended or adjusted under 35 U.S.C. 154(b) by 1134 days.

This patent is subject to a terminal disclaimer.

(21) Appl. No.: 13/163,850

(22) Filed: Jun. 20, 2011

(65) Prior Publication Data

US 2012/0318406 A1  Dec. 20, 2012

(51) Int. Cl.
| | | |
|---|---|---|
| B67D 7/84 | (2010.01) | |
| B60S 5/02 | (2006.01) | |
| F17C 5/00 | (2006.01) | |
| E04H 1/12 | (2006.01) | |
| B67D 7/04 | (2010.01) | |
| B67D 7/08 | (2010.01) | |

(52) U.S. Cl.
CPC . B67D 7/845 (2013.01); B60S 5/02 (2013.01); B67D 7/04 (2013.01); B67D 7/08 (2013.01); E04H 1/1233 (2013.01); F17C 5/00 (2013.01)

(58) Field of Classification Search
CPC ..................................... B60S 5/02; F17C 5/00
USPC ................ 141/231; 222/173, 608; 137/234.6; 244/135 A
See application file for complete search history.

(56) References Cited

U.S. PATENT DOCUMENTS

| | | | |
|---|---|---|---|
| 1,989,940 A | 2/1935 | McGaughan, et al. | |
| 3,476,140 A * | 11/1969 | Jusyk | 137/392 |
| 3,570,617 A * | 3/1971 | O'Day | 180/184 |
| 3,687,400 A | 8/1972 | Fitzgerald et al. | |
| 3,910,368 A * | 10/1975 | Weber et al. | 180/213 |
| 4,397,370 A | 8/1983 | Smith | |
| 4,901,748 A | 2/1990 | Shotmeyer | |
| 4,986,446 A | 1/1991 | Montgomery et al. | |
| 5,103,712 A * | 4/1992 | Minovitch | 89/1.11 |
| 5,131,438 A * | 7/1992 | Loucks | 141/1 |
| 5,200,256 A | 4/1993 | Dunbar | |
| 5,530,650 A * | 6/1996 | Biferno et al. | 701/300 |
| 5,596,501 A | 1/1997 | Comer et al. | |
| 5,624,137 A | 4/1997 | Lesesne | |
| 5,692,647 A | 12/1997 | Brodie | |
| 5,735,639 A | 4/1998 | Payne et al. | |
| 6,176,046 B1 | 1/2001 | Quine et al. | |
| 6,311,873 B1 | 11/2001 | Willeke et al. | |

(Continued)

FOREIGN PATENT DOCUMENTS

| | | |
|---|---|---|
| AT | A502478 A | 1/1980 |
| DE | 20213688 | 11/2002 |

(Continued)

*Primary Examiner* — Timothy L Maust
(74) *Attorney, Agent, or Firm* — Grogan, Tuccillo & Vanderleeden, LLP

(57) ABSTRACT

A modular, environmentally friendly mobile fuel distribution station includes a fuel tank, a support structure having a plurality of legs for supporting an operation platform in an elevated position a predetermined distance above ground, an alternative power generation device, the alternative power generation device being one of a solar power generator and a wind power generator for providing primary power to the mobile fuel distribution station and a central platform operatively connected to at least two of the legs, the at least two of the legs bearing the weight of the central platform, wherein the fuel tank and the alternative power generation device are disposed on the operation platform.

10 Claims, 26 Drawing Sheets

(56) References Cited

U.S. PATENT DOCUMENTS

| | | |
|---|---|---|
| 6,527,226 B1 | 3/2003 | Clifford et al. |
| 6,732,769 B2 | 5/2004 | Del Campo |
| 6,786,245 B1 | 9/2004 | Eichelberger et al. |
| 6,932,359 B2 * | 8/2005 | Ouellette .................... 280/7.14 |
| 7,021,010 B2 | 4/2006 | Smith et al. |
| 7,178,565 B2 | 2/2007 | Eichelberger et al. |
| 7,290,774 B2 * | 11/2007 | Despres ......................... 280/28 |
| 7,325,475 B2 | 2/2008 | Long |
| 7,431,241 B2 | 10/2008 | Adelson |
| 8,176,931 B1 * | 5/2012 | Cajiga et al. ............... 137/234.6 |
| 8,573,242 B2 * | 11/2013 | Cajiga et al. ............... 137/15.01 |
| 2009/0314382 A1 | 12/2009 | Capizzo |
| 2010/0230414 A1 | 9/2010 | Hunter |

FOREIGN PATENT DOCUMENTS

| | | |
|---|---|---|
| DE | 20309846 | 9/2003 |
| GB | 2460111 | 11/2009 |

* cited by examiner

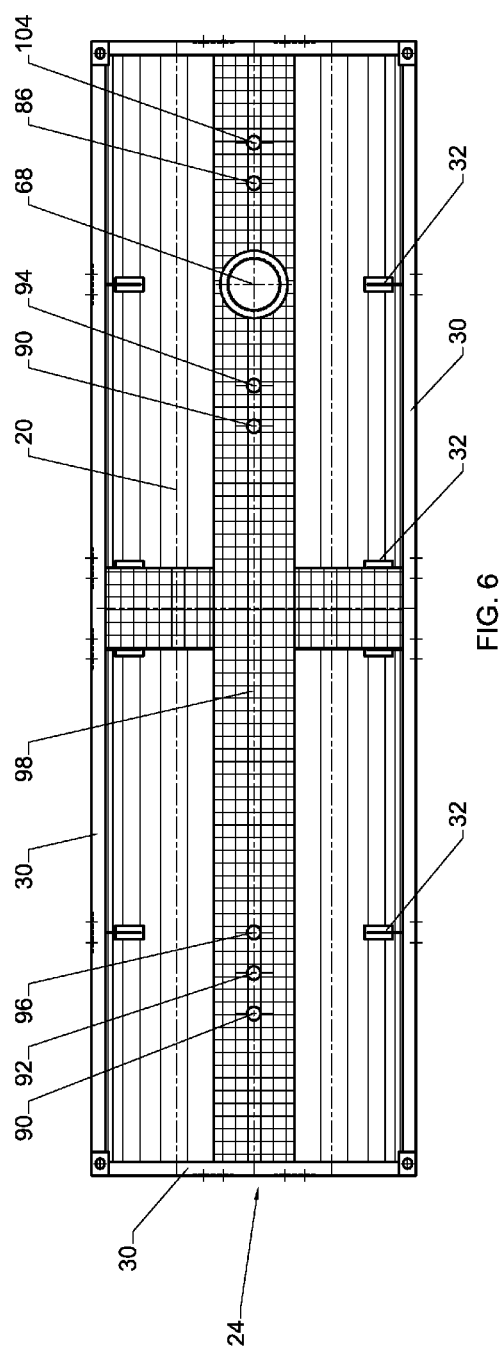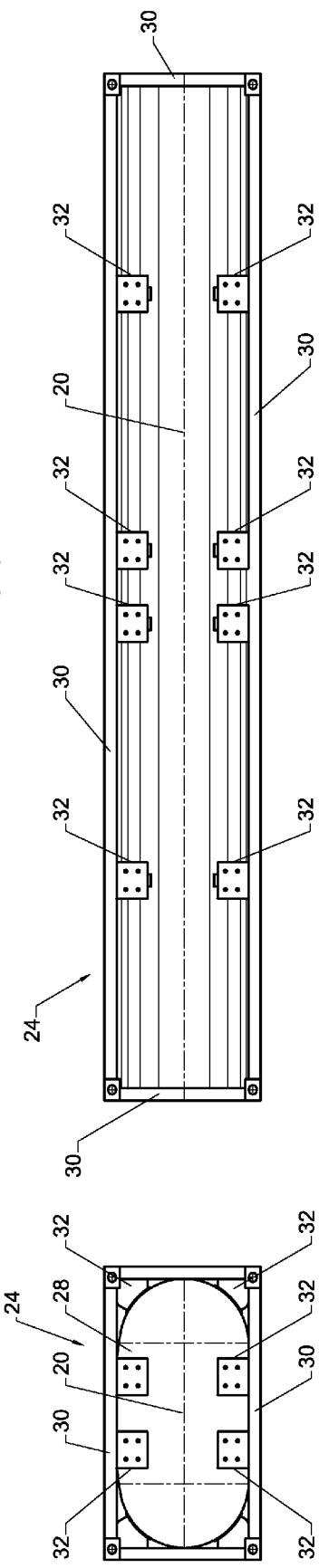
FIG. 6
FIG. 8
FIG. 7

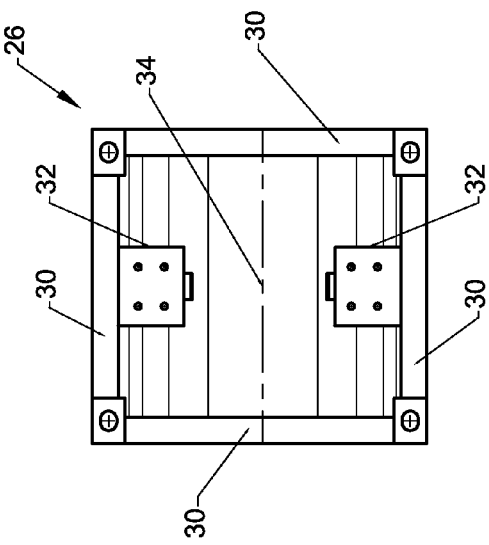
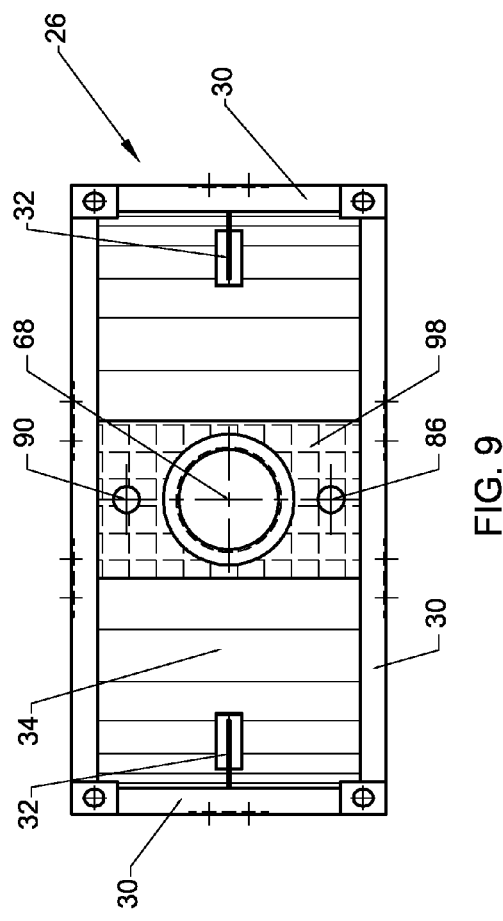
FIG. 9
FIG. 10
FIG. 11

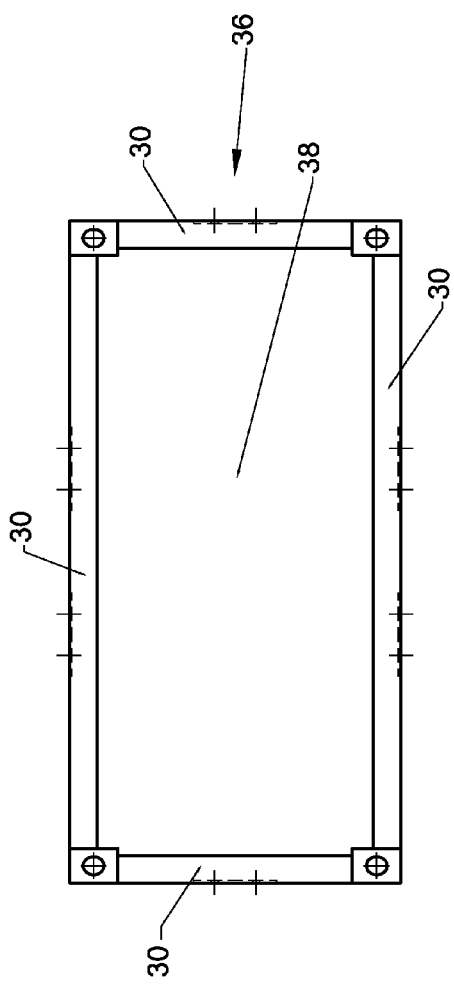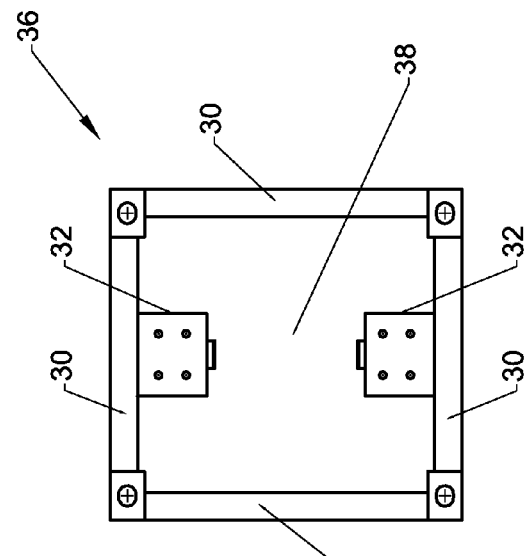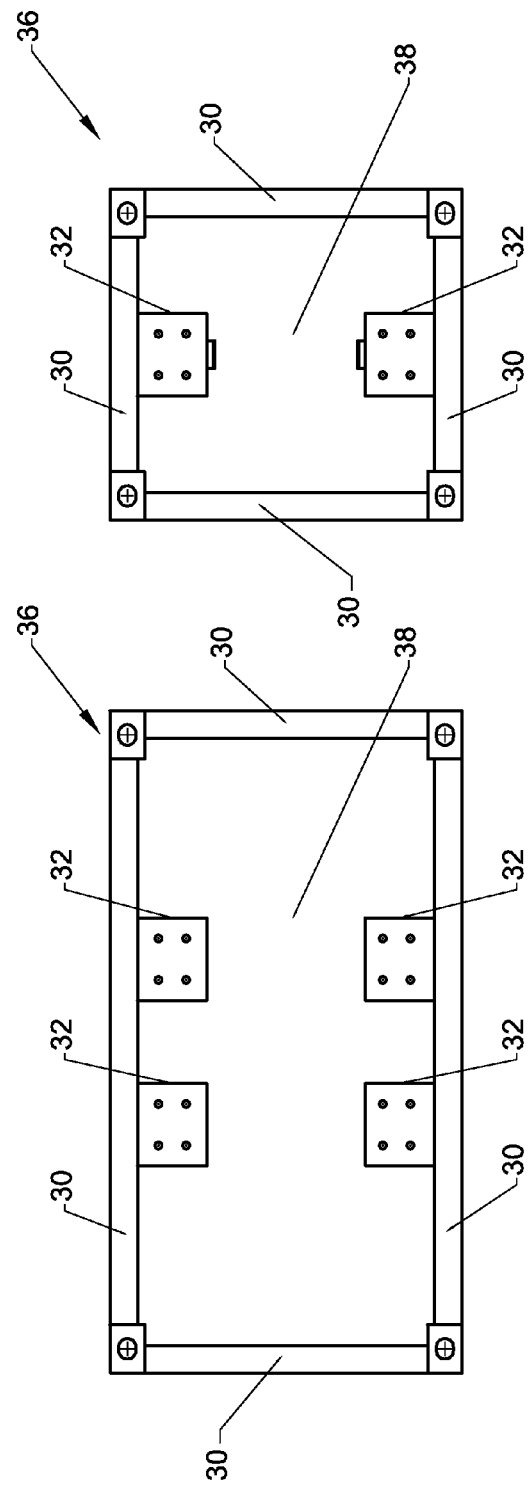

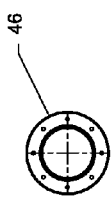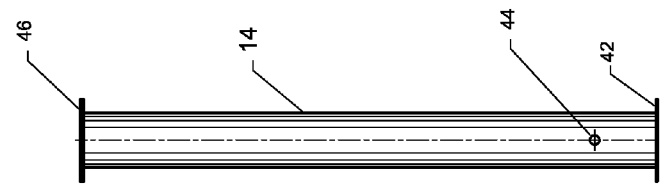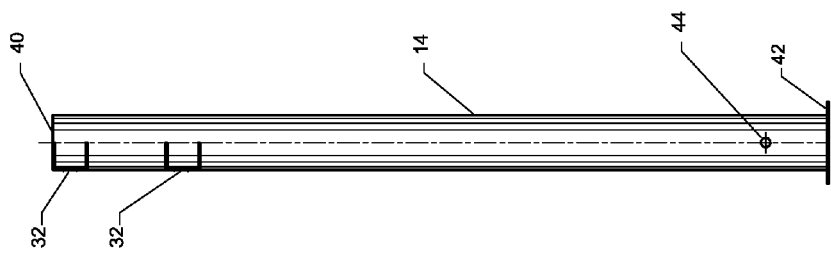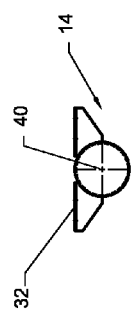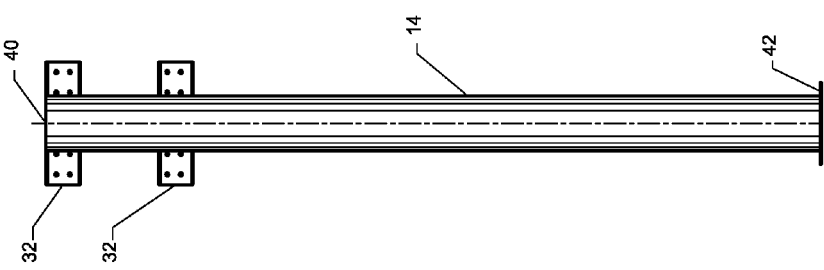

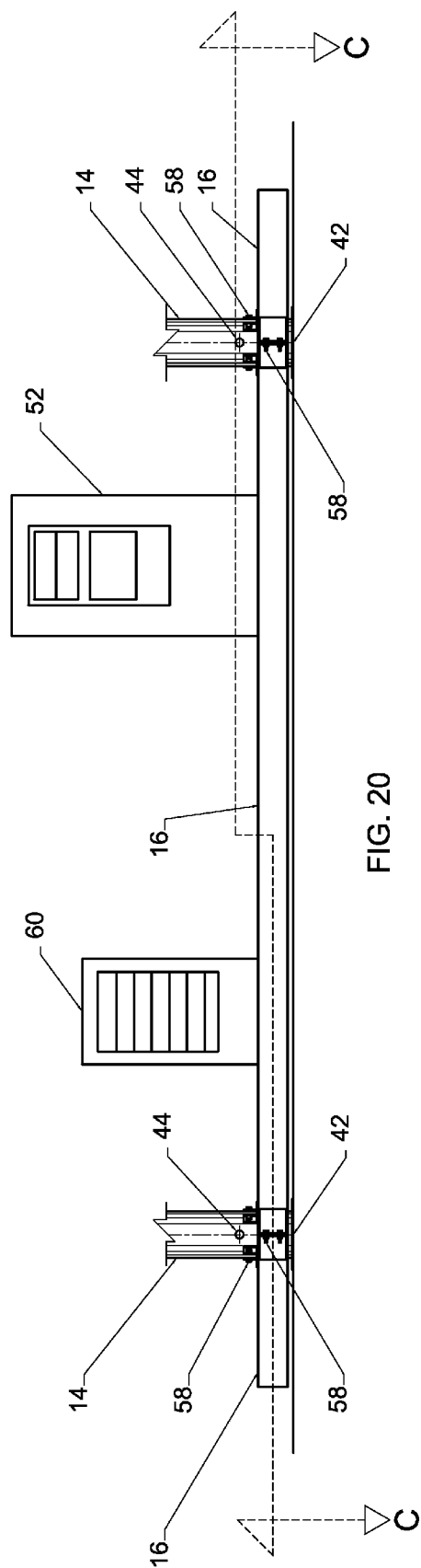
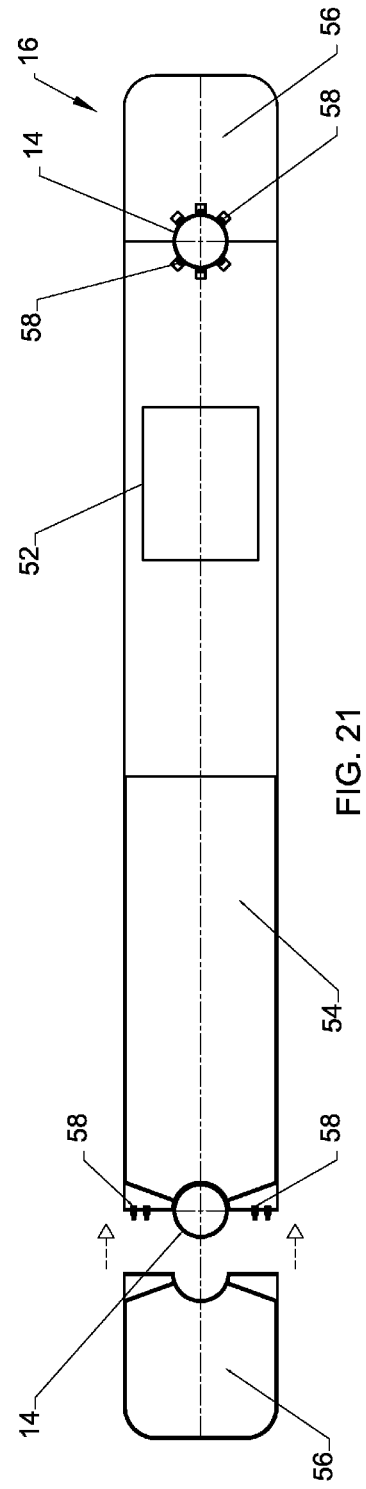

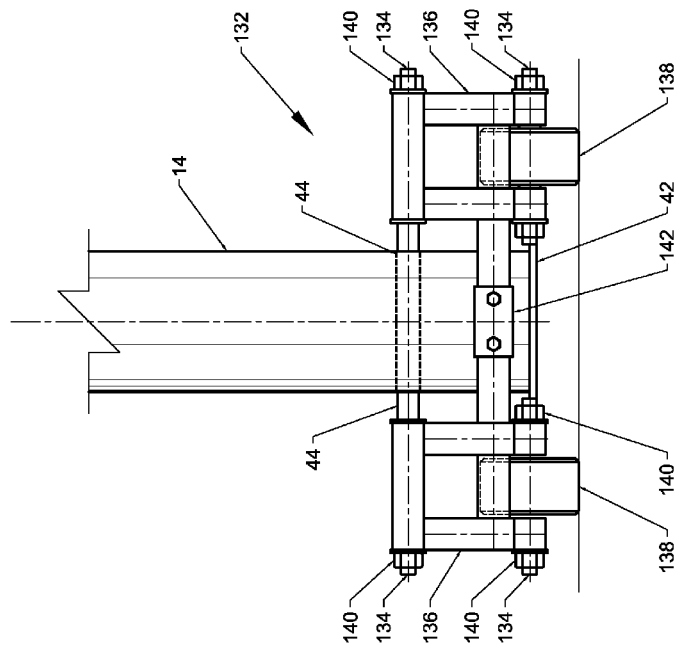
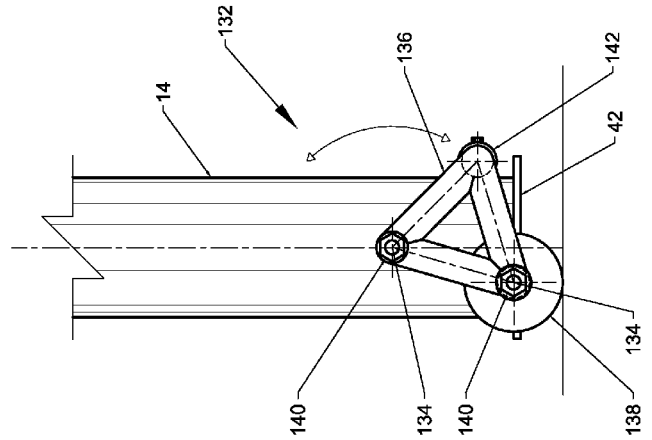
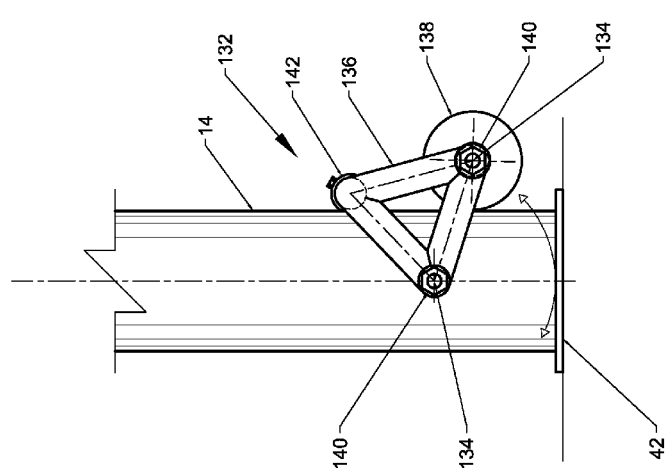

MOBILE FUEL DISTRIBUTION SYSTEM

FIELD OF THE INVENTION

The present invention relates generally to fuel distribution stations and, more particularly, to a modular, environmentally friendly mobile fuel distribution station and related method of quickly transporting and assembling a mobile fuel distribution station.

BACKGROUND OF THE INVENTION

As more and more automobiles are put into service on roads across the globe to meet the transportation demands of an ever-expanding population, more and more fueling stations must be planned, permitted and constructed to provide a means of fuel distribution for such automobiles. The construction and operation of known fuel distribution and service stations, however, are lengthy, costly and resource-consuming undertakings. Surveys and studies of anticipated demand must be commissioned, the station designed in a configuration sufficient to meet the anticipated demand, permits must be pulled and a lengthy construction process commenced and completed before a single gallon of gasoline may be pumped. Moreover, known fuel stations are not flexible and are not capable of providing different types of fuels for distribution.

As will be readily appreciated, the construction of known fueling stations is also not the most environmentally-friendly practice. Indeed, the footprint of known fueling stations, in terms of both its permanence and from an environmental standpoint, is rather substantial. Currently, fossil fuel distribution is made through permanent establishments which require public works, excavations, etc. and which have no flexibility in terms of design or configuration. In addition, known stations require electricity from the electrical grid and cannot be relocated in an economically feasible or profitable way. For example, automotive fuels are typically stored in underground tanks from which the fuel is pumped to a fuel dispenser for dispensing into an automobile. These tanks are typically constructed of metal or fiberglass. Underground installation of these tanks requires relatively large excavations and coverage thereof and creates many potential problems.

One known problem associated with underground fuel tanks is leakage or seepage into the surrounding soil. This is particularly true of metallic tanks, which can corrode or degrade over time, especially in moist soil. Seepage into the surrounding soil results both in the steady loss of fuel and environmental (soil and water) pollution. Moreover, in case of flooding, the tanks installed underground are inefficient and the fuel in them may be contaminated with water and with sediments within the water. As these tanks are buried underground beneath the structure of the station, the cost of repairing and replacing a leaking underground tank can be extremely expensive. In addition, underground tanks are not designed to store different types of fuels, and other facilities are needed to store equipment and to perform processes needed to produce certain types of fuel and energy to deliver to automobiles.

Moreover, known fossil fuel distribution stations have very high operating costs because the fuel, stored in an underground tank, must be mechanically pumped from the tank to an automobile. As will be readily appreciated, this mechanical pumping consumes a lot of electricity.

In addition to the above, known fueling stations are relatively permanent in nature. They are anchored to the ground with tons and tons of poured concrete, have large fuel tanks buried many feet beneath the surface of the ground, and have many feet of underground piping routing fuel from the tanks to the pump and electricity from the electrical grid to the station. Accordingly, in the event that the fueling station is no longer in operation, a lengthy and expensive process of removing everything that was previously constructed (pilings, tanks, pumps, structure) must be competed to restore the land to a condition in which it can be easier to sell and/or meet zoning or land ordinances. In many cases, once installed, such facilities cannot practically be moved to different locations, or be sold.

Known "permanent" fueling stations also suffer from additional drawbacks. In remote areas where fuel is required, or may be required on short notice, it may not be practical to go through this lengthy and expensive planning and construction process to meet fuel demand. In addition, due to the lack of infrastructure in many remote areas, e.g., accessibility to the energy/electricity grid, it may not even be feasible to construct known fueling stations in such areas. In particular, the electrical energy required to operate the pumps, lights, credit card machines, etc. may simply not be readily available.

In view of the above-described drawbacks of known fueling stations, there is a need for a more environmentally friendly fueling station that can be planned, constructed and placed into service in a much shorter amount of time and at a lower cost than known stations. In addition, there is a need for a fueling station that is modular, mobile and that can be quickly and easily assembled in remote locations and operate self-sufficiently with little or no drawing of power from the electrical grid.

In addition to the above, the use of alternative energy sources is starting to become more prevalent in fuel markets. Indeed, the use and demand of alternative energy fuel for transportation is increasing at a rapid pace, and the types of fuels demanded and the consumption rates thereof can be expected to increase drastically from what has been seen to date. Accordingly, new generations of fuel distribution stations must be flexible in terms of their size and the types of fuel that they can store and dispense, as well as flexible in terms of changing their size and/or location in response to dynamically changing markets. There is a need for fuel distribution stations that are able to distribute different types of fuels, such as gasoline, diesel, natural gas, hydrogen, methanol and electricity to quickly charge electric cars.

With the forgoing problems and concerns in mind, it is the general object of the present invention to provide an environmentally friendly mobile fuel distribution station and related method of quickly transporting and assembling a mobile fuel distribution station.

SUMMARY OF THE INVENTION

With the forgoing concerns and needs in mind, it is the general object of the present invention to provide a mobile fuel distribution station.

It is another object of the present invention to provide a mobile fuel distribution station that may be easily and quickly installed in a minimum space.

It is another object of the present invention to provide a mobile fuel distribution station that enables automobiles to easily ingress and egress therefrom.

It is another object of the present invention to provide a mobile fuel distribution station that is easily integrated with additional components to form a fueling station of any desired size.

It is another object of the present invention to provide a mobile fuel distribution station that is very efficient in terms of power consumption.

It is another object of the present invention to provide a mobile fuel distribution station that does not require mechanical pumping to dispense fuel.

It is another object of the present invention to provide a mobile fuel distribution station that can operate without drawing electricity from the power grid.

It is another object of the present invention to provide a mobile fuel distribution station that has a low environmental impact.

It is another object of the present invention to provide a mobile fuel distribution station that uses gravity to dispense fuel.

It is yet another object of the present invention to provide a mobile fuel distribution station that uses a minimum number of pipes and wiring and requires no public works for its installation.

It is yet another object of the present invention to provide a mobile fuel distribution station that may be easily assembled and disassembled.

It is yet another object of the present invention to provide a mobile fuel distribution station that is self-sufficient and can operate in remote areas.

It is yet another object of the present invention to provide a mobile fuel distribution station that can be moved form one location to another.

It is yet another object of the present invention to provide a mobile fuel distribution station that complies with industry standards for transportation on trucks and ships.

It is yet another object of the present invention to provide a mobile fuel distribution station is configured for complete self-service.

It is yet another object of the present invention to provide a mobile fuel distribution station that has storage tanks capable of storing various types of fuel such as gasoline, diesel, CNG (compressed natural gas), LPG (liquefied petroleum gas), hydrogen and methanol.

It is another object of the present invention to provide a mobile fuel distribution station that can supply various types of fuel such as gasoline, diesel, biodiesel, hydrogen, methanol, CNG, LPG and electric power.

It is yet another object of the present invention to provide a mobile fuel distribution station that may be remotely monitored by a central control station or command center.

It is yet another object of the present invention to provide a mobile fuel distribution station having container assemblies that can easily be exchanged with other assemblies to replace equipment contained by such assemblies, and to perform maintenance on equipment without having long periods of down time.

It is yet another object of the present invention to provide a mobile fuel distribution station that can easily be manufactured, transported and assembled.

These and other objectives of the present invention, and their preferred embodiments, shall become clear by consideration of the specification, claims and drawings taken as a whole.

BRIEF DESCRIPTION OF THE DRAWINGS

The present invention will be better understood from reading the following description of non-limiting embodiments, with reference to the attached drawings, wherein below:

FIG. 6 is a top plan view of a main container assembly of the mobile fuel distribution station of FIG. 1.

FIG. 7 is a side elevational view of the main container assembly of FIG. 6.

FIG. 8 is an end elevational view of the main container assembly of FIG. 6.

FIG. 9 is a top plan view of an auxiliary container assembly of the mobile fuel distribution station of FIG. 1 having an auxiliary fuel storage tank.

FIG. 10 is an end elevational view of the auxiliary container assembly and auxiliary fuel tank of FIG. 9.

FIG. 11 is a side elevational view of the auxiliary container assembly and auxiliary fuel tank of FIG. 9.

FIG. 12 is a top plan view of an equipment container assembly of the mobile fuel distribution station of FIG. 1.

FIG. 13 is an end elevational view of the equipment container assembly of FIG. 12.

FIG. 14 is a side elevational view of the equipment container assembly of FIG. 12.

FIG. 15 is a front elevational view of a long leg of the mobile fuel distribution station of FIG. 1.

FIG. 16 is a side elevational view of the long leg of FIG. 15.

FIG. 17 is a top plan view of the long leg of FIG. 15.

FIG. 18 is a front elevational view of a short leg of the mobile fuel distribution station of FIG. 1.

FIG. 19 is a top plan view of the short leg of FIG. 18.

FIG. 20 is a detail, front elevational view of a central platform of the mobile fuel distribution station of FIG. 1.

FIG. 21 is a cross-sectional view of the central platform of the mobile fuel distribution station of FIG. 1, taken along line C-C of FIG. 20.

FIG. 29 is a side elevational view of a wheel system of the mobile fuel distribution station of FIG. 1 shown in a retracted position.

FIG. 30 is a side elevational view of the wheel system of FIG. 29 shown in an engaged position.

FIG. 31 is a front elevational view of the wheel system of FIG. 29 shown in an engaged position.

DETAILED DESCRIPTION OF THE PREFERRED EMBODIMENT

Figure 1:
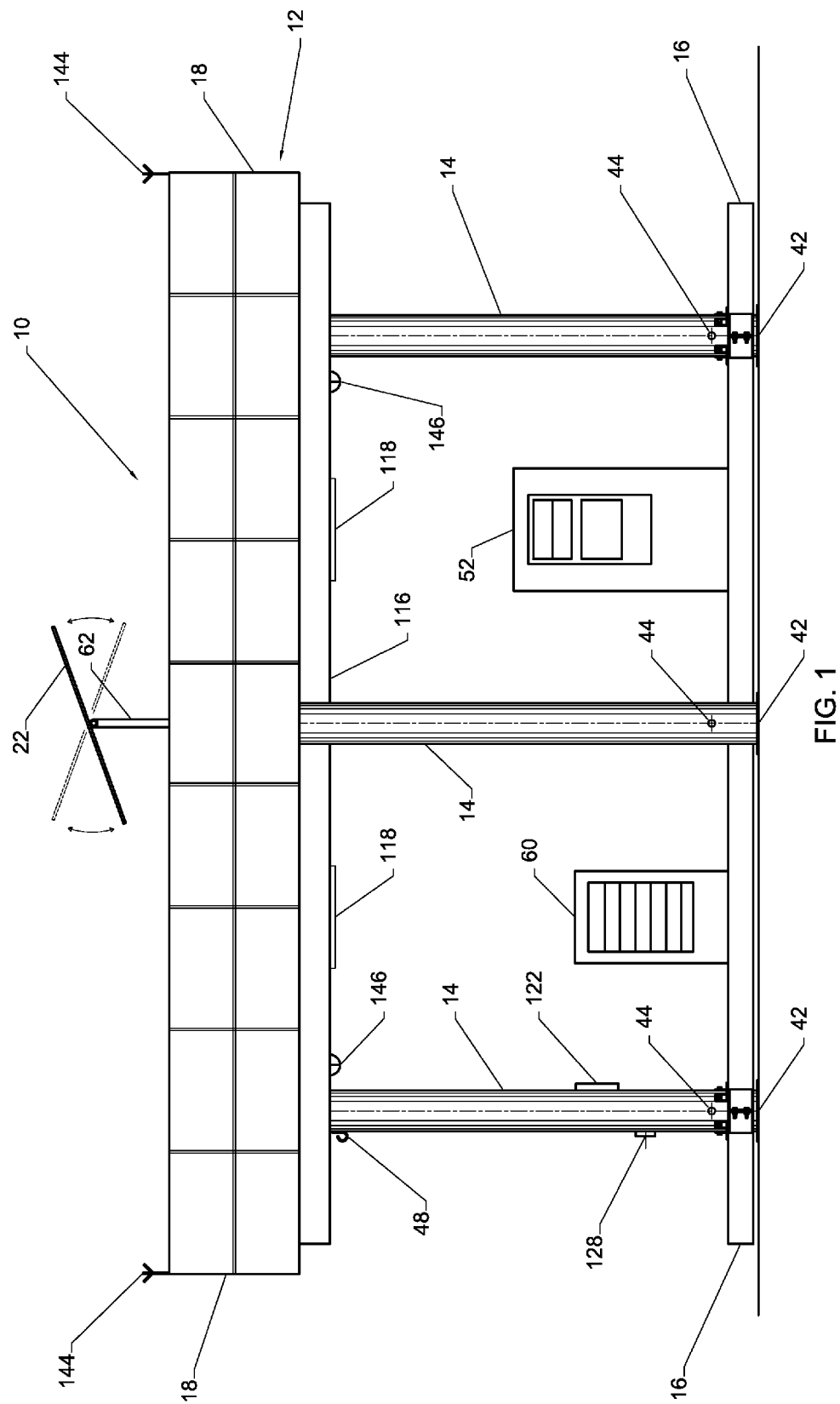
FIG. 1 is a front elevational view of a mobile fuel distribution station in accordance with one embodiment of the present invention.
Figure 2:
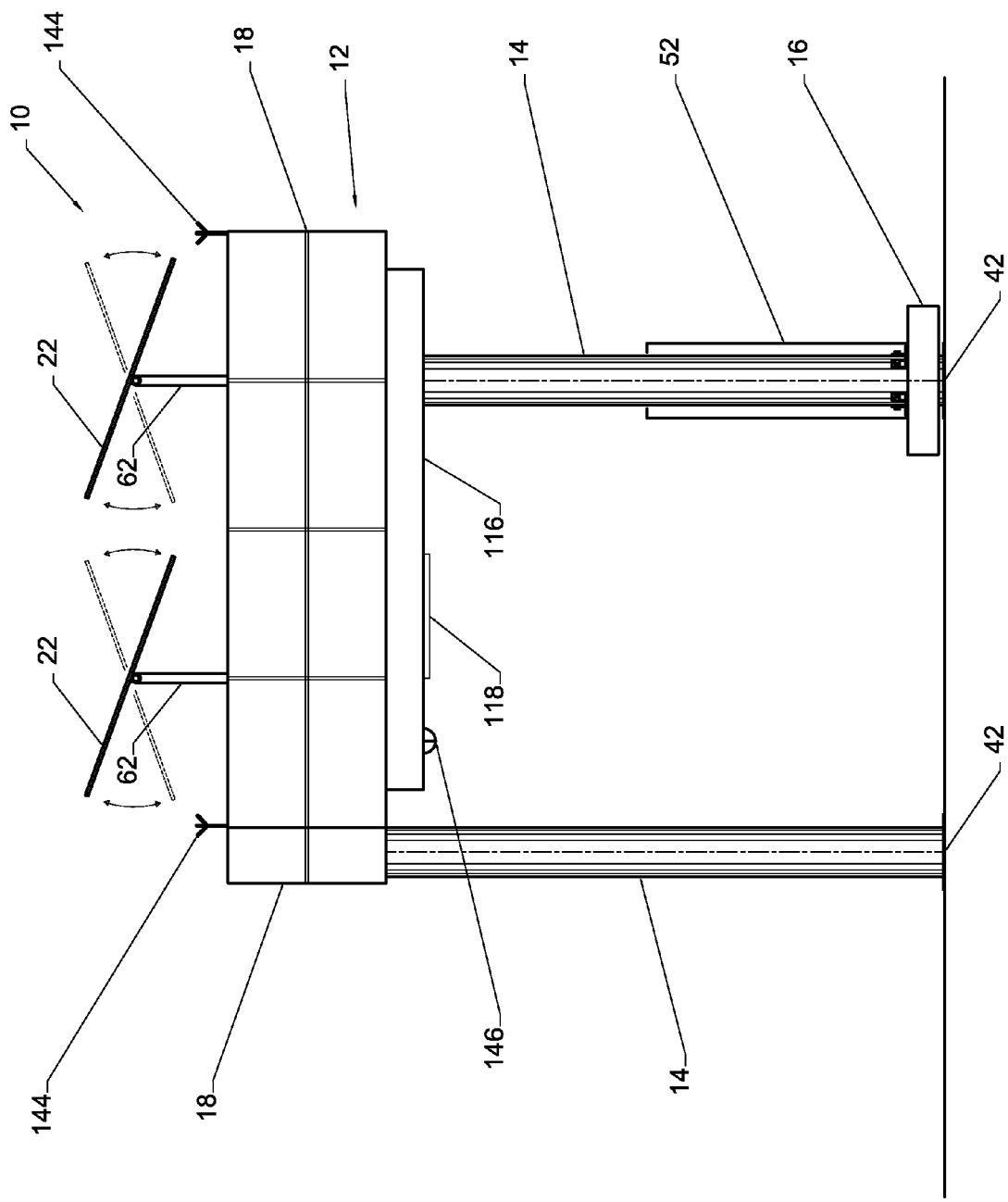
FIG. 2 is an end elevational view of the mobile fuel distribution station of FIG. 1.
Figure 3:
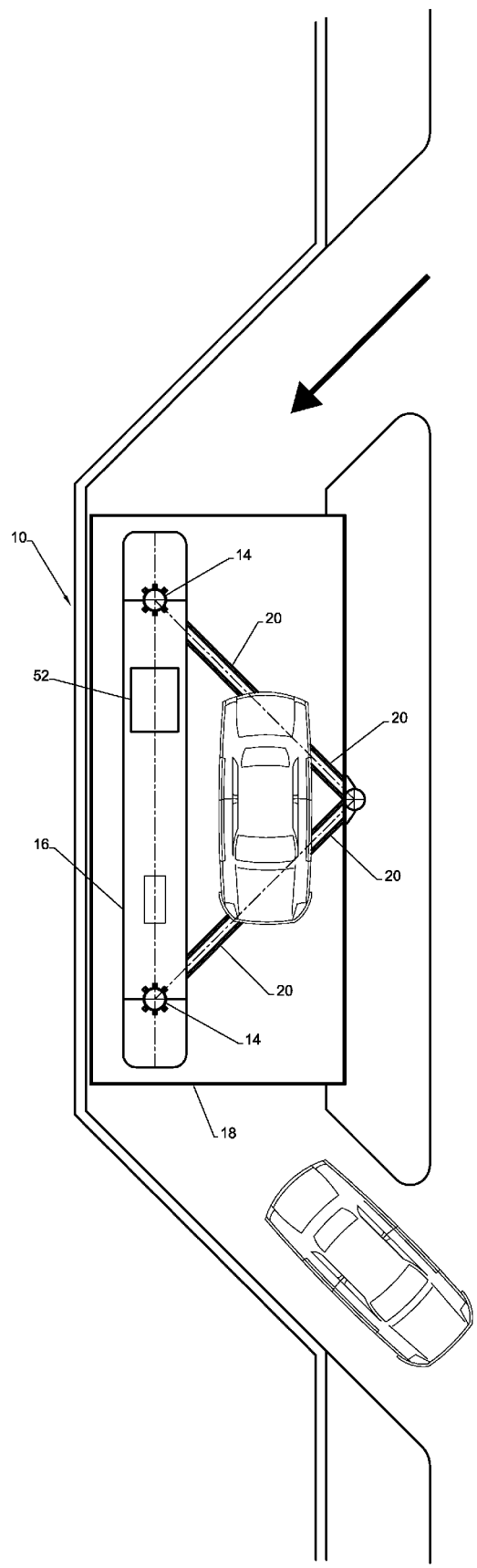
FIG. 3 is a top plan view of the mobile fuel distribution station of FIG. 1 shown without the storage tanks, and shown located adjacent a roadway.

Referring generally to FIGS. 1-5, a modular, environmentally friendly mobile fuel distribution station 10 according to one embodiment of the present invention is shown. With specific reference to FIGS. 1 and 2, the environmentally friendly mobile fuel distribution station 10 includes a generally rectangular operation platform 12, a plurality of legs 14 that support the operation platform 12 in an elevated position above the ground and a central platform 16 that provides a service interface for patrons of the station 10. The operation platform 12 is covered by a plurality of modular panels 18 that function to both block from view, and protect, the main functional components of the station 10 housed within the operation platform 12, as discussed in detail below. As best shown in FIGS. 1 and 3, the central platform 16 is operatively connected to a pair of the legs 14. The legs 14, themselves, are joined together by rigid linkage elements 20, which provide increased rigidity and support to the station 10. In the preferred embodiment, exactly three legs 14 support the operation platform 12 in an elevated position, although a support structure having more or less than three legs is also possible without departing from the broader aspects of the present invention.

The mobile fuel distribution station 10 further includes at least one alternative power generation device, such as one or more solar panels 22, supported in an elevated position by the legs 14. The solar panels 14 are tiltable and rotatable 360 degrees to collect and convert sunlight to electricity to provide power to the mobile fuel distribution station 10, as discussed below. While a solar panel 22 is utilized as the alternative power generation device in the preferred embodiment, other alternative power generation devices, such as a wind turbine, may also be utilized alone or in combination with the solar panels 22 without departing from the broader aspects of the present invention.

Figure 4:
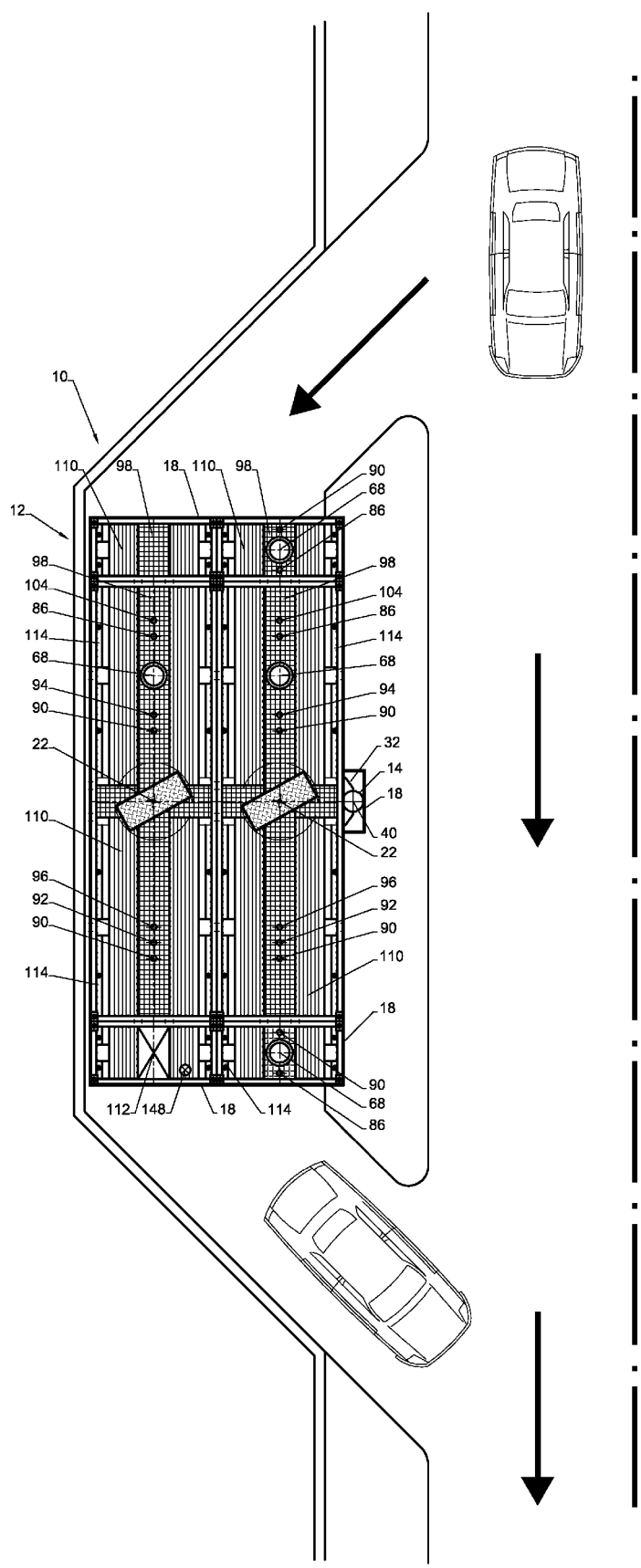
FIG. 4 is a top plan view of the mobile fuel distribution station of FIG. 1 shown located adjacent a roadway.
Figure 5:
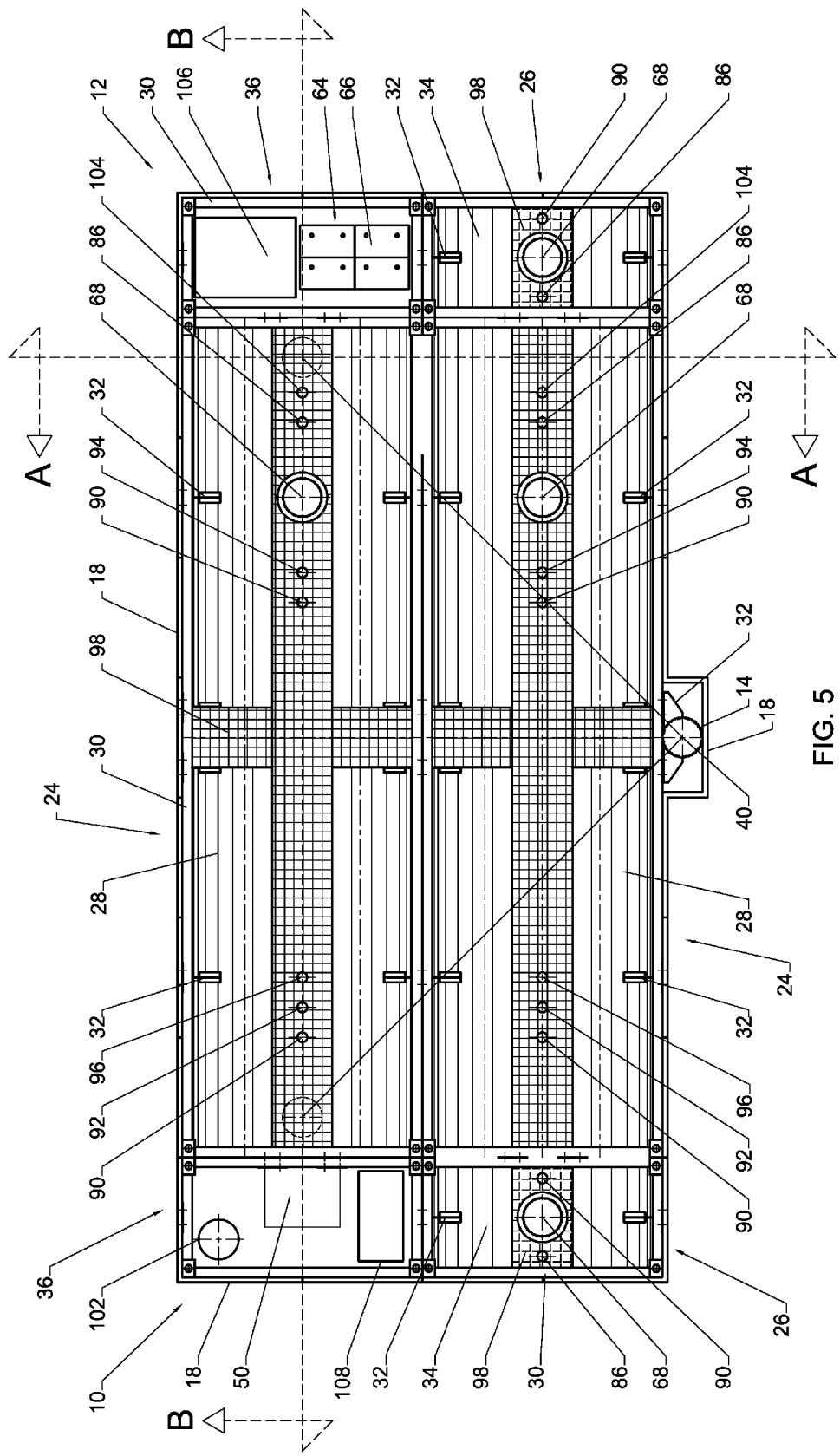
FIG. 5 is a detail, top plan view of the mobile fuel distribution station of FIG. 1 (with the roof not shown).

Turning now to FIGS. 4 and 5, the operation platform 12 generally comprises at least one, and preferably two, main container assemblies/modules 24, at least one, and preferably two, auxiliary container assemblies/modules 26 and at least one, and preferably two, equipment room container assemblies/modules 36. Detail views of these container assemblies are best shown in FIGS. 6-14. As first shown in FIGS. 6-8, each main container assembly 24 includes a generally tubular fuel storage tank 28 mounted within a generally rectangular frame 30. Optionally, the main container assembly may be enclosed by walls (not illustrated). Preferably, the storage tank 28 is elliptical in cross section, although tanks of other shapes and types, such as atmospheric pressure, high pressure or cryogenic tanks, are certainly possible without departing from the broader aspects of the present invention.

Importantly, the main fuel storage tank 28 and/or frame 30 surrounding the tank are configured with mounting brackets 32 for attaching various container assemblies together (such as a main container assembly 24 with an auxiliary container assembly 26). The mounting brackets are also utilized for attaching the legs 14 to the container assembly 24, as discussed in more detail below, so that the main container assembly 24 may be supported in an elevated position a predetermined distance above ground. The mounting brackets 32 also act as a support to effect the mounting of modular panels 18. In the preferred embodiment, at least some of the mounting brackets 32 are integrally formed with, welded to or otherwise directly fastened to the main fuel storage tank 28. As shown in FIGS. 6-8, each longitudinal side of the main storage tank 28 preferably has four pairs of mounting brackets 32 and each lateral side has two pairs of mounting brackets 32, although more or fewer mounting brackets arranged in any configuration may be used without departing from the broader aspects of the present invention.

Turning now to FIG. 9-11, enlarged views of an auxiliary container assembly 26 having an auxiliary storage tank 34 are shown. The auxiliary container assembly 26 includes a generally tubular auxiliary fuel storage tank 34 mounted within a generally rectangular frame 30. Preferably, the auxiliary storage tank 34 is elliptical in cross section, although auxiliary tanks having alternative cross-sectional shapes and types, such as atmospheric pressure, high pressure or cryogenic tanks, are certainly possible without departing from the broader aspects of the present invention. As will be readily appreciated, the auxiliary fuel storage tank 34 is much shorter in length than the main storage tank 28 and provides the fuel distribution station 10 with additional fuel capacity. Optionally, the auxiliary container assembly 26 may also be enclosed by walls (not illustrated)

The auxiliary storage tank 34 and/or frame 30 surrounding the tank act as assembly modules and are also configured with mounting brackets 32 for attaching various container assemblies/modules together (such as a main container assembly 24 with the auxiliary container assembly 26), for attaching the legs 14 to the container assemblies, if desired, so that the container assemblies may be supported in an elevated position, and for releasably attaching the modular panels 18, as discussed below. In the preferred embodiment, at least some of the mounting brackets 32 are integrally formed with, welded to or otherwise directly fastened to the auxiliary fuel storage tank 34. As shown therein, each longitudinal side of the storage tank 34 or frame has two pairs of mounting brackets 32 and each lateral side has one pair of mounting brackets 32, although more or fewer mounting brackets arranged in any configuration may be used without departing from the broader aspects of the present invention.

Turning now to FIG. 12-14, enlarged views of an auxiliary container assembly in the form of an equipment room container assembly/module 36 are shown. As shown therein the equipment room container assembly 36 includes a generally rectangular frame 30 defining an open container space 38 therein and a plurality of mounting brackets 32 for attaching various container assemblies together (such as a main container assembly 24 with the equipment room container assembly 36), for attaching the legs 14 to the container assembly so that the main container assembly 24 may be supported in an elevated position, and for attaching the modular panels 18. In the preferred embodiment, each longitudinal side of the frame 30 has two pairs of mounting brackets 32 and each lateral side has one pair of mounting brackets 32, although more or fewer mounting brackets arranged in any configuration may be used without departing from the broader aspects of the present invention. The equipment room container assembly 36 may be enclosed along one or more sides and can be used as an engine, equipment or storage room and can house mechanical, electrical or other type of equipment as well as a control system for storing and communicating information and parameters relevant to the mobile fuel distribution station 10, as discussed in detail below. As will be readily appreciated, the equipment room container assembly 36 is the same configuration as the auxiliary container assembly 26, albeit without the auxiliary fuel storage tank 34.

Referring back to FIG. 5, the basic mobile fuel distribution station 10 includes two main container assemblies 24 positioned side by side. Importantly, the main container assemblies 24 are rigidly affixed to one another by way of the mounting brackets 32. In particular, the mounting brackets 32 integrally formed with the longitudinal sides of each tank 28 are aligned and brought into registration with one another such that bolts or the like can be provided through apertures in the brackets 32 to secure the brackets 32, and thus the tanks 28, together. Alternatively, the mounting brackets 32 may be welded together to provide the desired rigid connection between the tanks. It should be noted, however, that the present invention is not limited in this regard, as only a single tank 28 may be supported in the operation platform 12 without departing from the broader aspects of the present invention.

As further shown therein, the basic station 10 further includes two auxiliary container assemblies 26 attached by appropriate mounting brackets 32 to respective ends of one of the main container assemblies 24 and two equipment room container assemblies 36 attached by appropriate mounting brackets 32 to respective ends of the other of the pair of main container assemblies 24. Moreover, each auxiliary container assembly 26 is rigidly attached to the end of one of the main container assemblies 24 by way of the provided mounting brackets 32. In particular, the mounting brackets 32 integrally formed on one end of the auxiliary fuel storage tank 34 are aligned and brought into registration with the mounting brackets 32 integrally formed with the end of one of the main fuel storage tanks 28. As described above, bolts or the like are then provided through the apertures in the brackets 32 to affix the brackets 32 to one another and to thereby rigidly attach the auxiliary fuel storage tank 34 to the main fuel storage tank 28.

As will be readily appreciated, the equipment room container assemblies 36 are attached to the ends of the main container assemblies 24 and the sides of the auxiliary container assemblies 26 by mounting brackets 32 attached to the respective frames 30. In particular, mounting brackets 32 attached to the equipment room assembly frame 30 are brought into registration with the mounting brackets 32 attached to the main container assembly frame 30 and auxiliary container assembly frame 30, respectively, such that bolts may be used to secure the brackets 32, and thus the frames 30 of the container assemblies 24,26,36, together.

Turning now to FIGS. 15-19, the configuration of the support legs 14 for supporting the operation platform 12, including the main container assemblies 24, auxiliary container assemblies 26 and equipment room container assemblies 36, as well as the associated fuel tanks 28,34 and operational components, in an elevated position, is shown. In the preferred embodiment, there are two types of legs 14 that are employed. The first type of leg 14, as shown in FIGS. 15-17, is tall and includes a plurality of mounting brackets 32 rigidly connected to and extending from an upper end thereof for mounting to corresponding mounting brackets 32 on one of the main container assemblies 24. As will be readily appreciated, bolts may be provided through the apertures in the mounting brackets 32 to rigidly affix this support leg 14 directly to one of the main container assemblies 24 to support the operation platform 12 above the ground. These legs 14 also have a top cover 40 enclosing an interior of the legs 14, shoes 42 at a bottom end thereof and a bushing 44 for accommodating a wheel assembly for adjusting a position or orientation of the station 10, as described below. As will be readily appreciated, the shoe 42 has a larger diameter than the support leg 14 itself, which provides a greater area of contact between the station 10 and the ground, thereby providing enhanced support and stability for the station 10.

The second type of leg 14, as shown in FIGS. 18 and 19, is shorter and has a shoe at 42 the bottom end thereof for providing a greater area of contact with the ground, a mounting flange 46 at a top end thereof and a bushing 44 for accommodating a wheel assembly. Of course, the legs 14 may all be of the same height, or may all have different heights, without departing from the broader aspects of the present invention. In addition, while the legs 14 are shown as being cylindrical cross-section, legs having alternative cross-sectional shapes, such as square, may alternatively be employed.

Preferably, one or more of the legs 14 are made of a composite armor or are otherwise armor plated or have an armored skin or panels 18 to protect the interior pipelines and components housed therein, as discussed below, from puncture or damage. Additionally, as discussed above, each leg 14 may have a cap or cover 40 to further protect the supply and distribution pipelines housed within the legs 14, as discussed below, from the elements. A ladder support 48 for accommodating a ladder for accessing the tanks 28, 34 and the other components within the operation platform 12 is fixedly secured to at least one of the support legs 14. In operation, an operator or service technician can hook a ladder onto this support 48 and climb the ladder to reach an access door 50 in the underside of the operation platform 12.

Figure 22:
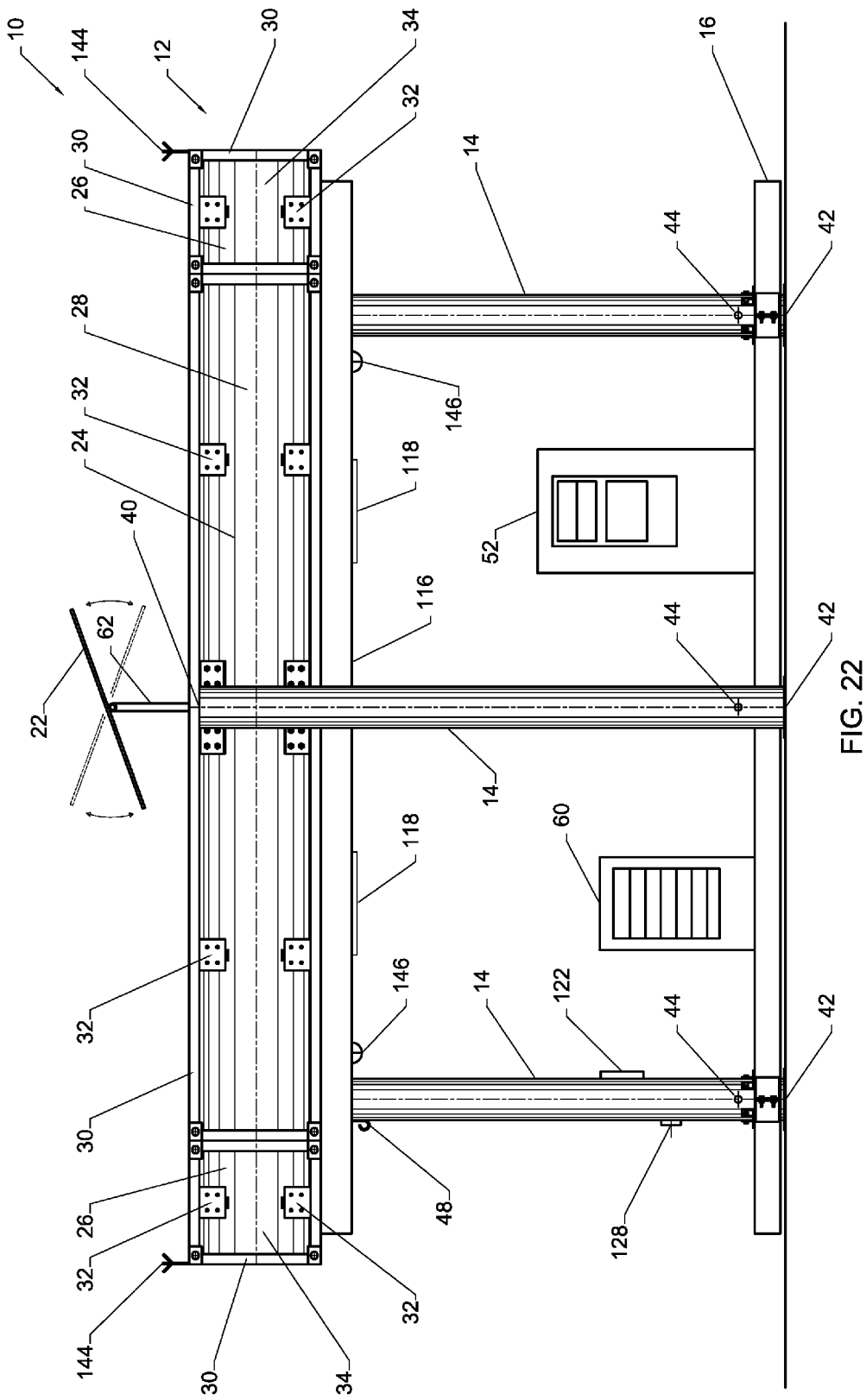
FIG. 22 is a front elevational view of the mobile fuel distribution station of FIG. 1 with the perimeter structure removed and showing the attachment of the legs to the tank.
Figure 23:
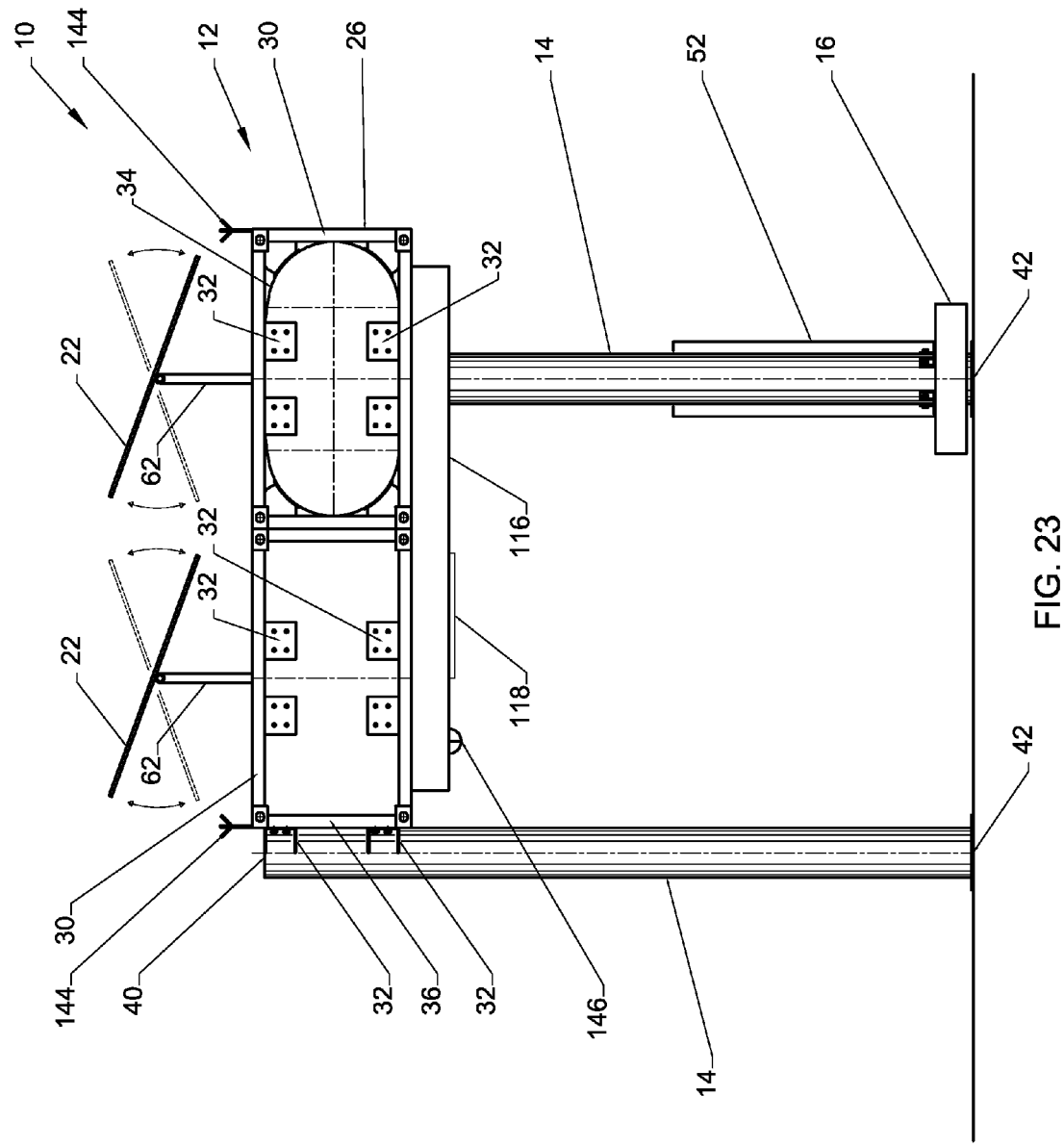
FIG. 23 is an end elevational view of the mobile fuel distribution station of FIG. 1 with the perimeter structure removed and showing the attachment of the legs to the tank.

With reference to FIGS. 22 and 23, a single tall leg 14 is rigidly connected to one of the main fuel storage tanks 28 by fastening the mounting brackets 32 extending from the upper end the leg with the corresponding mounting brackets 32 integrally formed with a longitudinal side of the tank 28. As will be readily appreciated, during assembly, the corresponding brackets 32 are brought into alignment with one another such that bolts can be provided through apertures therein to secure the brackets 32 together. As best shown in FIG. 23, two short legs 14 are positioned opposite the tall leg 14 beneath the other main fuel storage tank 28 to support the other side of the station 10. The shorter legs 14 may be bolted or otherwise fastened directly to the main fuel tank 28 by means known in the art, such as welding or the like. Importantly, when rigidly connected to the operation platform 12, the legs 14 are arranged beneath the fuel tanks 28, 34 in a substantially triangular configuration when viewed from above.

Figure 24:
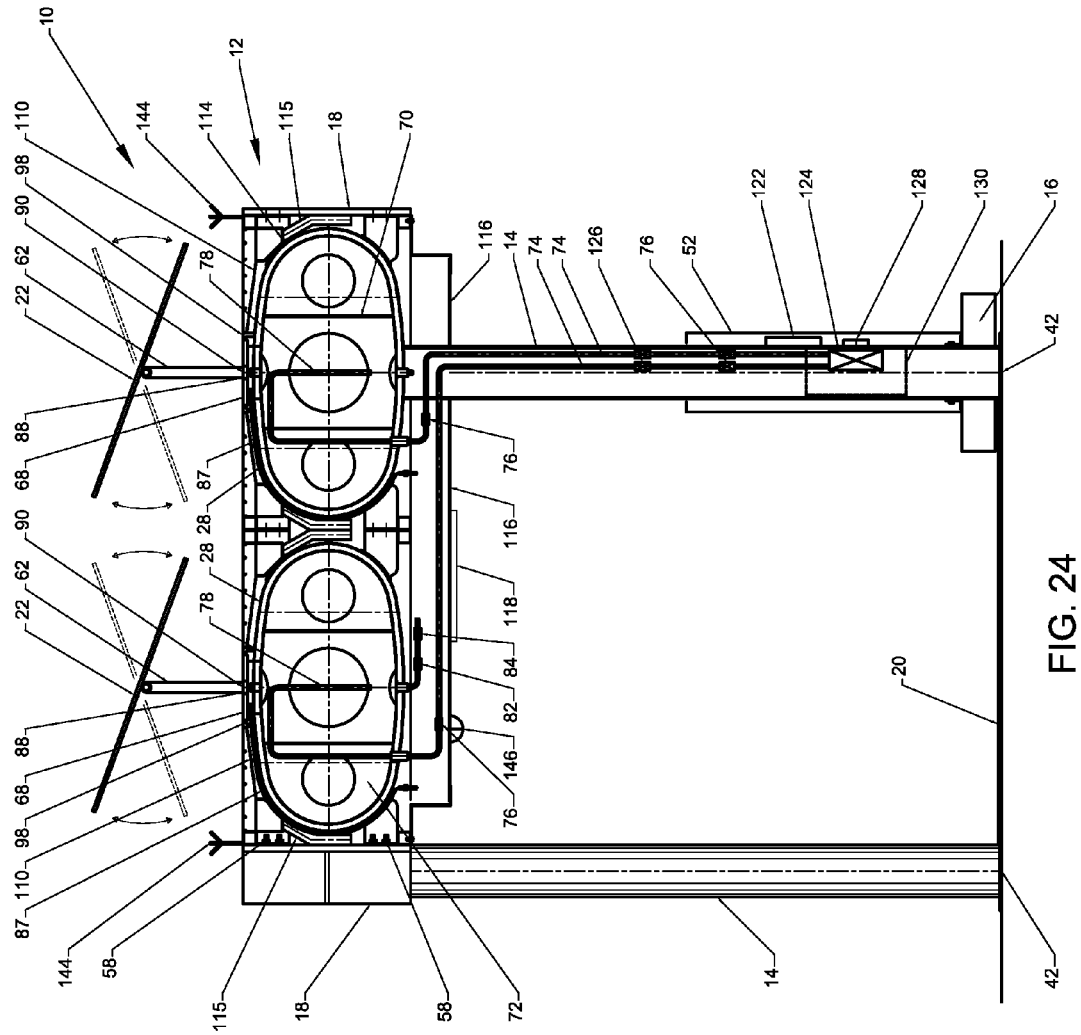
FIG. 24 is a cross-sectional view of the mobile fuel distribution station of FIG. 1 taken along line A-A of FIG. 5.

In order to provide rigidity and increased support to the mobile fuel distribution station 10, linkage elements 20 rigidly connect the support legs 14 together, as disclosed above. As shown in FIGS. 3 and 24, these linkage elements 20 are attached to the legs 14 by joint couplings (not shown) positioned just above the shoe 42 of the legs 14 (i.e., just above the ground). Importantly, by locating the linkage elements 20 adjacent to the ground, the linkage elements 20 not only provide increased rigidity and support for the mobile fuel distribution station 10, but also function as physical speed bumps to force drivers of automobiles to slow down inside the fueling area, thereby increasing safety.

As will be readily appreciated, the triangular configuration of the three support legs 14 of the mobile fuel distribution station 10 of the present invention allows for a unique and less restrictive traffic and flow pattern for automobiles passing underneath. In connection with this, the three leg support structure allows for an increased number of paths of ingress and egress for automobiles, as compared to known fueling stations having four or more supports, while at the same time provides a solid and balanced support structure for the station 10. As a result of this heretofore unknown support leg configuration, the mobile fuel distribution station 10 of the present invention has an increased number of paths of ingress and egress as compared to existing stations.

In stark contrast to the present invention, it will be readily appreciated that known static, non-modular fueling stations require four or more supports to hold a ceiling in an elevated position. This is disadvantageous in that the potential traffic patterns for automobiles passing underneath is extremely limited. Indeed, know fueling stations employing four or more support posts only allow automobiles to enter or exit in one or two directions.

Moreover, by only requiring three legs 14, reductions in materials for construction can be realized and, as will be discussed in more detail later, the three legs enable the rapid expansion of the station 10, wherein one of the three legs 14 may be utilized to partially support a secondary assembly or module.

The rigid connection of the main tanks 28 and auxiliary tanks 34, and the rigid connection of the equipment room container assemblies 36 with the main container assemblies 24 and auxiliary container assemblies 26, as discussed above, is also an important aspect of the present invention. That is, it is an important aspect of the present invention that the collective weight of the operation platform 12, including the weight of all assembly modules, fuel tanks, accessories and piping is distributed via the frame assemblies 30 through the actual body of the fuel tank 28. Thus, the collective weight of the operation platform 12, and all elements housed within, is distributed through the fuel tank 28 itself and into the elevating support structure, i.e., the legs 14.

It will be readily appreciated that by utilizing the body of the fuel tank 28 itself to distribute the weight of the operation platform 12 to the legs 14, material and costs savings can be realized. Indeed, the rigidly connected fuel tanks 28 act not just as passive elements (i.e., for the storage of fuel), but rather as active, load bearing and distribution elements. By rigidly connecting the fuel tanks 28,34, the tanks 28,34 act as a load-bearing beam, with the load from all of the components of the operation platform 12 being transmitted thereto. As the fuel tanks 28,34, and the main fuel storage tanks 28, in particular, serve the dual purpose of fuel storage and being the main structural and load bearing component of the station 10, material and cost savings are realized by eliminating the need for heavy and expensive supports, such as I-beams and the like, under the operation platform 12, thereby further reducing the materials and associated costs for building and transporting the mobile fuel station 10.

Referring back to FIGS. 20 and 21, detail views of the central platform 16 are shown. As shown therein, the central platform 16 is generally rectangular in shape and is operatively connected to a pair of legs 14 on one side of the station, on which fuel dispensers 52 for dispensing fuel from the fuel storage tanks 28,34 to patrons are mounted. The platform is comprised of three pieces, a central piece 54 and two opposed end pieces 56. The central piece 54 fits between the two legs 14 and the end pieces 56 bolt thereto with bolts 58 to encase the legs 14, as shown. The platform 16 is attached to the legs 14 with bolts just above the shoes 42 such that the whole weight of the platform 16 and the equipment it contains is transferred to, and supported by, the legs 14 (i.e., the legs 14 bear substantially the entire weight of the central platform 16). Importantly, as the platform is not secured to the ground, in contrast to known fueling stations that utilize rebar and poured concrete to permanently secure the fueling platform to the ground, the fuel distribution station 10 of the present invention remains mobile and is not permanent. As shown in FIG. 20, the platform 16 preferably includes a vending machine 60, or the like, for dispensing snacks, drinks or other items to patrons.

Figure 25:
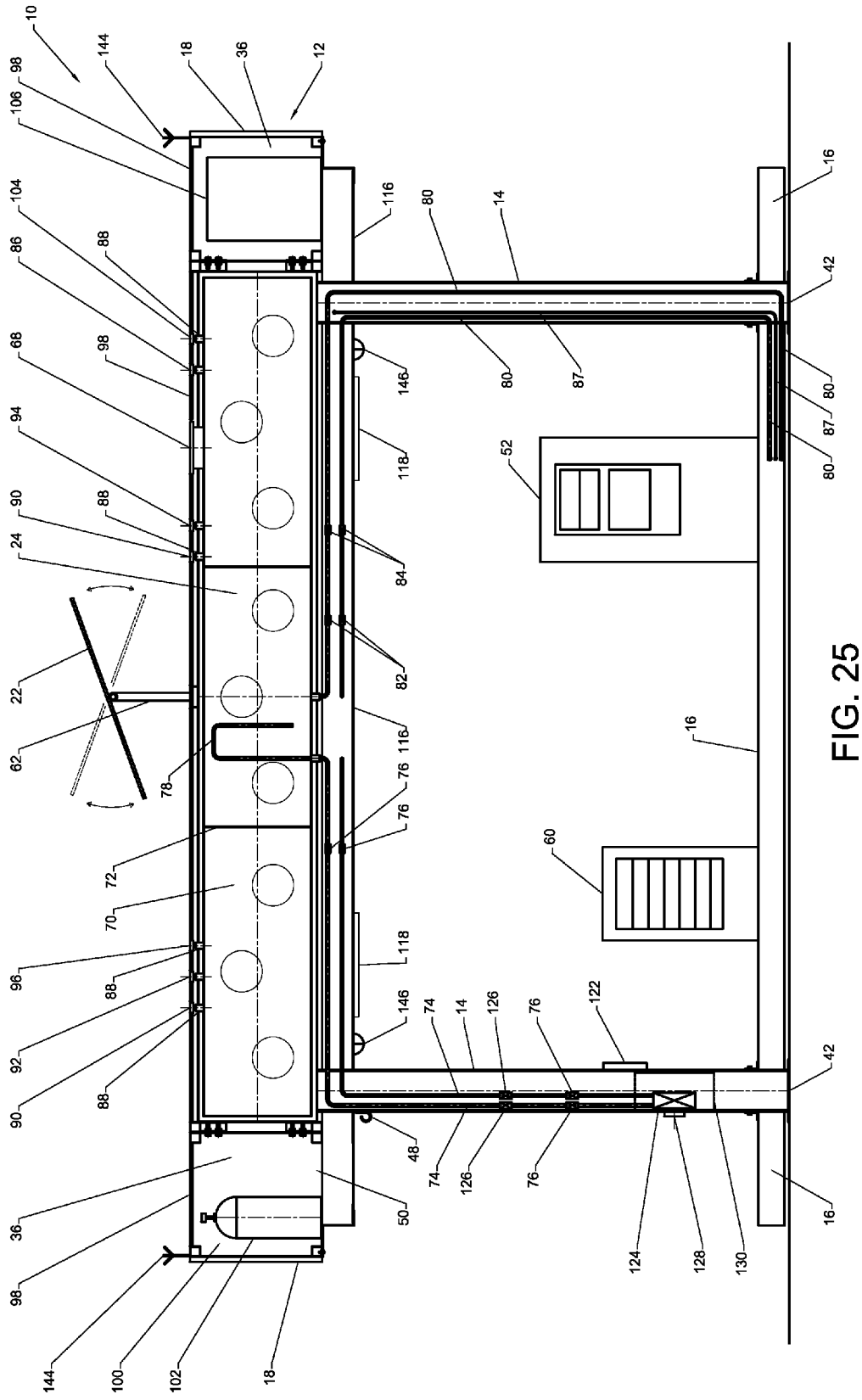
FIG. 25 is a cross-sectional view of the mobile fuel distribution station of FIG. 1 taken along line B-B of FIG. 5.

As discussed above, the mobile fuel distribution station 10 includes an alternative power generation device supported by the legs 14 and in close association with the operation platform 12 and, in particular, the main fuel tanks 28. As shown in FIGS. 5, 24 and 25, the alternative power generation device is preferably at least one solar panel 22 mounted on a pedestal 62 and operatively connected to the frame 30 or the upper surface of one of the main fuel storage tanks 28. In the preferred embodiment, each main fuel storage tank 28 has a solar panel 22 configured therewith. As discussed above, the solar panels 22 are preferably positioned above the fuel storage tanks 28 and are tiltable and rotatable 360 degrees to collect and convert sunlight to electricity to provide power to the mobile fuel distribution station 10. Preferably, the electricity generated from the solar panels 22 is stored in a battery bank 64 having one or more batteries 66 and located within one of the equipment room container assemblies 36, as shown in FIG. 5.

While the preferred embodiment of the present invention contemplates the use of one or more solar panels 22 to power the station 10, other forms of alternative energy may also be used. For example, a wind turbine for harvesting wind energy may be placed in electrical communication with the station 10 to provide operating power thereto. Indeed, a combination of two power sources (e.g., wind and solar) is also envisioned.

With further reference to FIGS. 24 and 25, a specific configuration of the main fuel tanks 28 and auxiliary fuel tanks 34 is shown. As shown therein, the main tank 28 and auxiliary tanks 34 have a selectively closeable/coverable aperture or passageway 68 to prove access to the interior of the tanks 28,34 for cleaning and/or other servicing. Importantly, the interior of the tanks include longitudinal division plates 70 and transverse division plates 72, having perforations or apertures therein, integrally formed with or otherwise rigidly attached to the walls of the tanks 28,34 that function to provide structural rigidity to the tanks 28,34. Importantly, the division plates 70,72 provide strength to the tanks 28,34 to allow for the tanks 28,34 to support the weight of the operation platform 12 and related components, as discussed above. These division plates 70,72 additionally function as a jetty to inhibit movement of fuel inside the tanks 24,34 in case of an earthquake or other impact force on the fuel distribution station that could, in certain instances, create uneven load distributions. As the fuel within the tanks 28,34 is partitioned, for the most part (with the exception of movement through the perforations), uneven load distributions due to any swaying or shaking of the station 10, such as by impact from an automobile, are minimized. The main and auxiliary fuel tanks 28,34 are preferably made of metal, although polymers and other materials known in the art and sufficient to support the weight of the operation platform 12 may also be used for the tank construction without departing from the broader aspects of the present invention.

As best shown in FIGS. 23 and 24, as well as in FIG. 5, the main and auxiliary fuel storage tanks additionally include necessary, couplings, piping, vents and siphons necessary for fuel loading and distribution. The piping installed through apertures in the tanks for loading and distribution may all have remote safety valves. In case of emergency, these safety valves may be easily operated by a central office/command center by remote control and/or from the lower part of the fuel distribution station where the fuel dispensers are located, as discussed in detail below. In particular, the loading pipeline 74 has a globe valve 76 integrated therein for regulating the flow of fuel from a supply truck to the tanks 28,34. At a distal end of the loading pipeline is an interior load siphon 78 to avoid producing fuel vaporization when the tanks 28,34 are being filled.

As further shown therein, the distribution pipeline 80 extends from the bottom of the tanks 28,34, through one or more of the legs 14, to the fuel dispensers 52, so that fuel can be dispensed from the storage tanks 28,34 to the dispensers 52, and ultimately to patrons on demand. The distribution pipeline 80 preferably includes an automatic security valve 82 and a solenoid valve 84 for regulating the flow of fuel out of the tanks 28,34 and for automatically ceasing flow if certain undesirable or unsafe conditions are detected. A sensor 86 for inventory control, such as those known in the art, is positioned inside each tank 28,34 so that an operator can monitor the level of fuel therein. An output of this sensor can be relayed to a remote command center, as discussed in detail below. Moreover, a hose 87 for vapor recovery is routed from the fuel dispensers 52, where vapors can be collected, through the central platform 16 and up one or more of the support legs 14 to an area above the storage tanks 28,34 where the vapors may be discharged.

As further shown therein, ventilation couplings 88 and a fixture for the control of vapors 90 provide a passageway from the main tanks 28 to dissipate gases generated inside the tanks 28. The ventilation couplings 88 and the fixture for the control of vapors 90 also serve to eliminate and dissipate fuel vapors that could become trapped within the station 10. A vacuum-pressure valve 92, a purging device 94 and an entrance for vapor recovery 96 are also provided as passageways from the tanks 28 to ambient air. As best shown in FIGS. 5, 6 and 9, the main fuel storage tanks 28 and auxiliary fuel storage tanks 34 have a flat, planar area 98 running the length of the tanks to allow for an operator or service technician to walk on top of the tanks 28,34 for servicing and maintenance.

As shown in FIG. 25, the operation platform 12 is also configured with an anti-fire system 100 that includes an extinguisher tank 102 containing a fire-retardant foam, a fire detection module (not shown), and a foam injector 104 in fluid communication with the extinguisher tank. In the preferred embodiment, the extinguisher tank 102 is housed within one of the equipment room container assemblies 36. The fire detection module includes one or more sensors for detecting fire, high temperatures, and smoke. In operation, upon detecting fire or smoke, the system 100 automatically dispenses the fire-retardant foam from the extinguisher tank 102 and distributes it through a conduit to the foam injector 104. The foam injector 104 is configured to spray or otherwise blanket the operation platform 12 and, in particular, the fuel storage tanks 28,34, with the foam to stem the spread of fire.

With further reference to FIG. 5, in the preferred embodiment one of the equipment room container assemblies 36 houses an inverter, the battery bank 64 having a plurality of batteries 68 for storing electricity for powering the mobile fuel distribution station as discussed above, and a fossil fuel power generator 106.

As discussed previously, the main source of electrical power for the station 10 is envisioned to be an alternative energy generation device, such as the solar panel 22 and battery bank 64, wind turbine or the like. In the event that the alternative energy power generation device cannot keep up with electrical demand for whatever reason, however, the fossil fuel generator 106 can automatically provide backup or auxiliary power to keep the station 10 in service. For example, it may be necessary to provide additional power during refilling of the fuel tanks 28,34 from a supply truck. For safety reasons as well, a backup power supply is desirable. In the preferred embodiment, the power generator 106 may be a diesel, gasoline, CNG or other type of generator, which may preferably operate using the fuel stored in one of the fuel storage tanks 28,34, or the public power source from the power grid, if available.

In one embodiment, the auxiliary fuel tank 34 or the main fuel tank 28 may be operationally integrated with the fossil fuel generator 106 for supplying power to the station 10 in the event the alternative power generation device is either non-operational or operating at a power level below optimum.

As further shown therein, the other equipment room container assembly 36 houses the main components of the automatic anti-fire system 100 as well as an air compressor 108. This equipment room container assembly 36 also has an access door 112 for allowing a person to access the top side of the mobile fuel distribution station 10. As will be readily appreciated, however, each of the equipment room container assemblies may have selectively lockable access doors 50 to allow access to the room from below, as disclosed above. In addition, each of the equipment room container assemblies 36 can be used to store any desired equipment or components. Importantly, by housing the majority of components in the equipment rooms 36 in an elevated position above the main fueling area, they are kept out of reach and out of sight of patrons. In addition, such a configuration allows all components to be physically kept on the station 10, as opposed to apart from the station 10, such that every single component or piece of equipment is moved or relocated simultaneously when the station 10 is moved or relocated.

Figure 26:
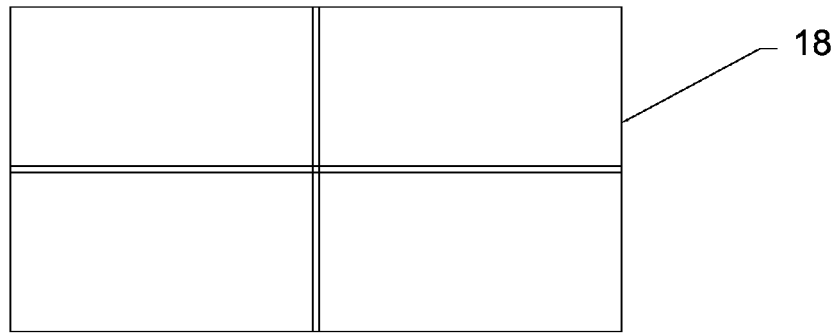
FIG. 26 shows a large size modular panel of the mobile FIG. 46 mobile fuel distribution station of FIG. 1.
Figure 27:
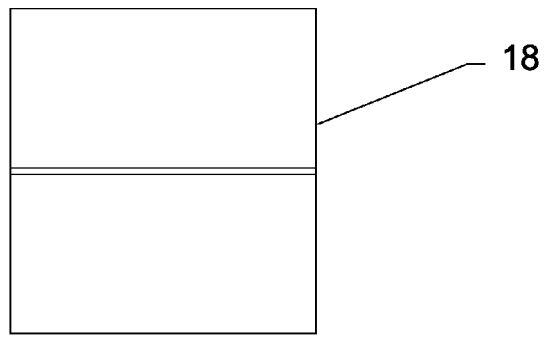
FIG. 27 shows a medium size modular panel of the mobile fuel distribution station of FIG. 1.
Figure 28:
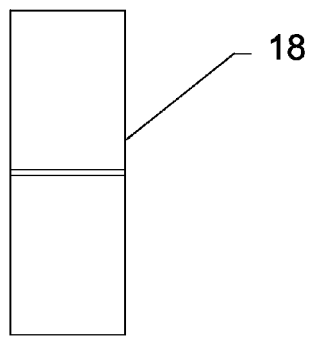
FIG. 28 shows a small size modular panel of the mobile fuel distribution station of FIG. 1.

As alluded to above, the operation platform 12 includes a plurality of modular panels 18 that function to both block from view, and protect, the main functional components of the station 10 housed on or within the operation platform 12. These modular panels are best shown in FIG. 26-28 and are preferably three different sizes. As will be readily appreciated, the modular panels are oriented substantially vertically and are releasably affixed, such as by bolting or securing by other means known in the art, to the frame 30 of the container assemblies 24,26,36 such that they entirely surround the operation platform 12 (main container assemblies 24, auxiliary container assemblies 26 and equipment room container assemblies 36) of the mobile fuel distribution station 10. While the modular panels 18 may be manufactured from any material known in the art, such as fiberglass, sheet metal, stainless steel and the like, it is preferred that the modular panels 18 are composite armor panels such that in their assembled position the panels 18 form a armored skin sufficient to protect the main and auxiliary fuel storage tanks 28,34, equipment and piping from damage or puncture from bullets and the like. In an alternative embodiment, the modular panels 18 forming a composite armor skin may also be configured about the alternative power generation device, such as the solar panel 22, for added protection.

The modular panels 18 may be outfitted with advertising, brand identifying or other information such company logo, type of fuel offered, price of fuel, etc. In addition, or alternatively, an electronic, digital display may be attached to the modular panels to digitally display this information. In the preferred embodiment, the electronic display may be powered by the alternative energy generation device (i.e., the solar panel 22, wind turbine or the like) or by the backup fossil fuel generator 106.

A roof 110, preferably in the form of one or more fiberglass panels may cover the entire operation platform 12 including the two main container assemblies 24, the two auxiliary container assemblies 26 and the two equipment room container assemblies 36. A gate 112 in the roof 110, as disclosed above, allows for access to the top of the station 10. A water collection canal 114 may be configured on an inner surface of the modular panels 18 or attached to the frame 30 and preferably extends along the entire inner periphery of the operation platform 12. In operation, as rainwater falls on the roof 110 of mobile fuel distribution station 10, it is guided by a sloped contour of the roof into the collection canals 114. A series of conduits and pipes 115 then guide the accumulated water from the collection canals 114 downwards to the ground and away from the station 10.

As shown, for example, in FIGS. 1, 2 and 22-25 a ceiling structure 116 is attached to the bottom of the frame 30 of the container assemblies 24,26,36 or other structural elements by means known in the art, such as nuts and bolts. The ceiling structure 116 functions to shield the main tanks 28, auxiliary tanks 34 and other components of the station 10 from view from below, adding to the aesthetics of the station 10, as well a providing a place to mount low consumption lighting for illuminating the area beneath the station 10. In particular, the ceiling structure 116 may be used as a surface to mount lamps 118 for illuminating the area beneath the station. The ceiling structure 116 may also serve as a surface to mount emergency lamps 120 that can run on back-up battery power in the event the main lamps 118 are not operable. While the ceiling structure 116 may be manufactured from any material known in the art, such as fiberglass, sheet metal, stainless steel and the like, it is preferred that the ceiling structure 116 is also comprised of composite armor panels 18 sufficient to protect the main and auxiliary fuel storage tanks 28,34, equipment and piping from damage or puncture from bullets in the like. As further shown therein, an electrical control panel 122 is attached to one of the legs 14 of the station 10 so that an operator of the station may control the lighting and other operations such as refueling and the like.

As disclosed above, the operation platform 12 and the legs 14 may be configured with composite armor panels or skin, or manufactured from composite armor materials to protect the storage tanks 28, 34, pipelines and equipment from projectiles, such as bullets and the like. In the preferred embodiment, one or more of the support legs 14 are hollow, as shown in FIGS. 24 and 25, and function to provide a protective housing for the various pipes and wires that route fuel, electrical wires and the like throughout the fuel distribution station 10. In particular, at least the pair of legs 14 on one side of the station are hollow and serve as a protective housing to house and protect pipes running from the fuel tanks 28,34 to the fuel dispensers 52 that are located on the central platform 12 between the pair of support legs 14. Moreover, the portion of the pipes routed under or within the central platform 12 are also protected by the platform 12, which may also be formed from or protected by a composite armor skin. The pipes that direct the fuel from the storage tank to the supply dispensers 52 may be either rigid or flexible. In addition, at least one of the support legs 14 functions as an armored housing to protect the loading pipeline 74 that is need to supply fuel to the storage tanks 28,34 located in the operation platform 12 when refilling is needed, as best shown in FIGS. 24 and 25.

As further shown in FIGS. 24 and 25, a progressive cavity pump 124, together with an explosion-proof electric engine may also be housed within one of the hollow support legs 14 to pump supply fuel from a tanker truck or the like to the storage tanks 28,34. In connection with the progressive cavity pump 124, a manual safety globe valve 76 and a check valve 126 may also be positioned along the loading pipeline within the leg 14 that enables the passage of fuel from a supply truck and up through the supply piping into the storage tanks 28,34, but which prevents fuel flow in the reverse direction to prevent fuel from spilling out. A connection 128 for fuel loading is provided at bottom end of the loading pipeline 74 to allow for a supply hose from a tanker truck to be placed in fluid communication with the loading pipeline 74. Controlled access for the valves and connection may be provided via a door or gate 130 in the support leg or legs 14. Therefore, as will be readily appreciated by one of ordinary skill in the art, the tanks 28,34, pump 124, associated fuel lines 80, and fuel dispensers 52 having a nozzles comprise a distribution means for facilitating the measured and monitored dispensing of fuel.

In an alternative embodiment, the pump 124 and electric engine may be omitted from the fuel distribution station 10. In this embodiment, the pump supplying fuel to the storage tank may instead be integrated with the supply truck. As will be readily appreciated, omitting the pump 124 from the station 10 further decreases assembly time and minimizes costs.

As noted above, the environmentally friendly mobile fuel distribution station 10 may also include a wheel assembly 132 for providing a means of selectively moving or adjusting the position of the mobile fuel distribution station 10. The wheel assembly 132 is best shown in FIGS. 29-31. As shown therein, the wheel assembly 132 is operatively connected to one or more of the support legs 14 via a metal axis 134 provided through the support leg bushing 44. The axis 134 may be made of steel or other material capable of supporting the weight of the station 10. The bushings 44 mounted in the legs facilitate rotation of the axis 134 relative to the support legs 134 to allow for engagement and disengagement, respectively, of the wheel assembly 132, as discussed in detail hereinafter. Wheel supports 136 having a generally triangular shaped truss configuration extend from the axis 134 on both sides of the support leg 14 and have a wheel or tire 138 mounted thereto.

Preferably, the wheel assembly 132 has two wheels or tires 138 that are connected to the wheel supports 136 with a second steel axis 134 and nuts 140 on opposing sides of one or more support legs 14. A coupling 142 joins the two wheel supports 136 on opposing sides of the support leg 14 together to provide increased rigidity and strength to the assembly 132. As shown therein, the wheel assembly 132 is selectively pivotable about the metal axis 134 from a first position, in which the wheel 138 is positioned above the ground (as shown in FIG. 29), to a second position, in which the wheel 138 is brought into contact with the ground to lift the support leg 14 and shoe 42 off the ground to permit movement of the station 10.

In the preferred embodiment, each of the three support legs 14 has a wheel assembly 132 attached thereto. In alternative embodiments, however, only one or two of the support legs 14 may be configured with a wheel assembly. In such embodiments, to transport or move the location of the mobile fuel distribution station 10, the support legs 14 not configured with a wheel assembly 132 may be lifted off the ground and towed by a truck or the like to a desired location such that the mobile fuel distribution station 10 maintains contact with the ground only through the tires 138 of the wheel assembly 132.

The wheel assembly 132 is an important aspect of the present invention as it allows the station 10 to be easily moved once it is assembled. For example, it could be moved from location to location, as needed, or it can be moved within a parking lot or the like to orient the station 10 as desired in response to changing traffic patterns and the like. As will be readily appreciated, the ability to rotate or change the position of the station 10 within a parking lot lends added flexibility to the mobile fuel distribution station 10. Such flexibility is simply not possible with existing stations that are permanently anchored in the ground.

The mobile fuel distribution station 10 of the present invention may also have a number of additional components that provide a variety of safety features. For example, the fuel distribution station may include a lightning arrester system including one or more lightning rods 144 for preventing or minimizing damage to the station due to a lightning strike. The lightning rods 144 are preferably mounted to one of the support legs 14 or the panels 18 of the station 10, extends substantially vertically therefrom, and is grounded so as to direct the electricity of a lightning strike down the structure to the earth, preferably through a ground rod (not shown).

As alluded to above, the mobile fuel distribution station 10 of the present invention may also include an electronic control system for remote inventory control, supply, sales, video image transmission, automobile recognition, care of emergency situations and customer service. The electronic control system is connected via satellite, optic fiber, or the like, and is linked to a control headquarters of command center, thereby enabling service provision and information in real time from a remote location. Importantly, the control system is electrically connected to the sensors for inventory control 86 and the fuel dispensers 52 and is configured for selectively permitting and monitoring a discharge of fuel from the station 10.

As will be readily appreciated, the control system is configured to monitor numerous parameters of the fuel tanks 28,34 (such as type of fuel in the tanks and level remaining) and the station as a whole. In connection with this, the mobile fuel distribution station has a video camera 146 for monitoring the activity of customers around the station 10. The sensor for inventory control 86 relays a level of fuel remaining in the tanks. In addition, the station has a credit card interface or payment apparatus at each fuel dispenser 52 so that customers may pay for the purchase of fuel via credit card, debit card and the like, including a customized card containing automobile recognition or identifying data. The mobile fuel distribution station 10 may further include a telecommunications interface (not shown) for directly connecting a patron to a service representative. The telecommunications interface may have a microphone and a speaker whereby a pushbutton can directly connect a patron to a service representative at a remote command center to troubleshoot or to answer questions relating to payment and the like. The interface may be located on the fuel dispenser 52, a leg 14 of the station 10 or other area, but in any event, in an area readily accessible to patrons.

This interconnected network of sensors, cameras and credit card interfaces comprises a control system operating via an array of control circuitry that can store and transmit data about the fuel distribution station 10. In particular, the control system monitors the fuel distribution means, as disclosed above, and stores and transmits this data. Importantly, these sensors, cameras and interfaces require very little electricity and can be powered by the alternative power generation device, such as the solar panel 22. The control system also monitors energy production and usage and will augment or substitute power from the fossil fuel generator 106 when power from the alternative power generation device does not keep up with current demands. The station 10 additionally includes a satellite antenna 148 for wirelessly transmitting the data collected by the various sensors, payment apparatus and cameras to a remote command center, as discussed below. Importantly, even the satellite antenna 148 and associated wireless technology can be powered by the on-site alternative energy generation device, or fossil fuel generator 106, if necessary. By collecting and storing data parameters relating to the station, and by wirelessly transmitting the data to the remote command center, the mobile fuel distribution station 10 may be controlled from the remote command center in dependence upon the collected data parameters, as discussed below. As will be readily appreciated, by allowing the station 10 to be controlled form the remote command center, minimal or no staff must be present at the physical station 10, thereby contributing to further cost savings.

Turning now to FIGS. 32-35, another important aspect of the present invention is the ability to add or subtract components from the basic mobile fuel distribution station disclosed above to form a mobile fuel distribution station of any desired size, as well as to provide for a greater plurality of possible fuels that could be dispensed from the fuel distribution station. As noted above, the basic mobile fuel distribution station 10 of the present invention preferably has three support legs 14 arranged in a triangular configuration such that two legs are generally in line with one another along one longitudinal side of the station 10, while the remaining third leg is positioned at a longitudinal midpoint of the station 10 along the opposing longitudinal side. If additional fuel tanks 28,34 or additional space for operational components are desired, additional main tank assemblies 24, auxiliary tank assemblies 26 or equipment room assemblies 34 can be added to the station 10 by rigidly attaching such assemblies to the basic station 10 by way of the mounting brackets 32. In certain embodiments, when additional container assemblies 24,26, 34 are added, at least one of the existing support legs 14 may be used to support the weight of such assemblies.

Figure 32:
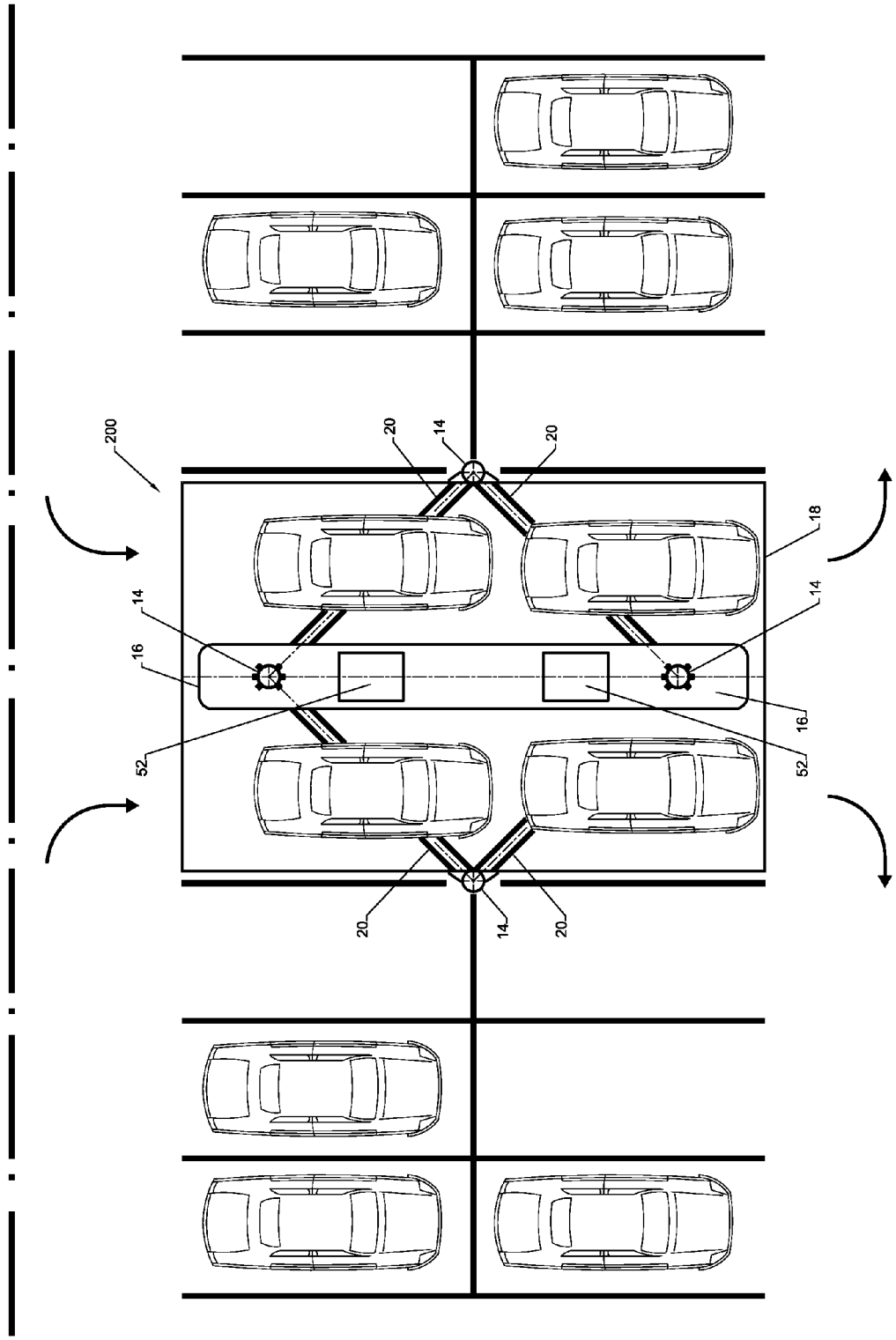
FIG. 32 is a top plan view of a three-tank mobile fuel distribution station installed in the footprint of 6 spaces for automotive vehicles in a parking lot, shown without the container assemblies, in accordance with one embodiment of the present invention.
Figure 33:
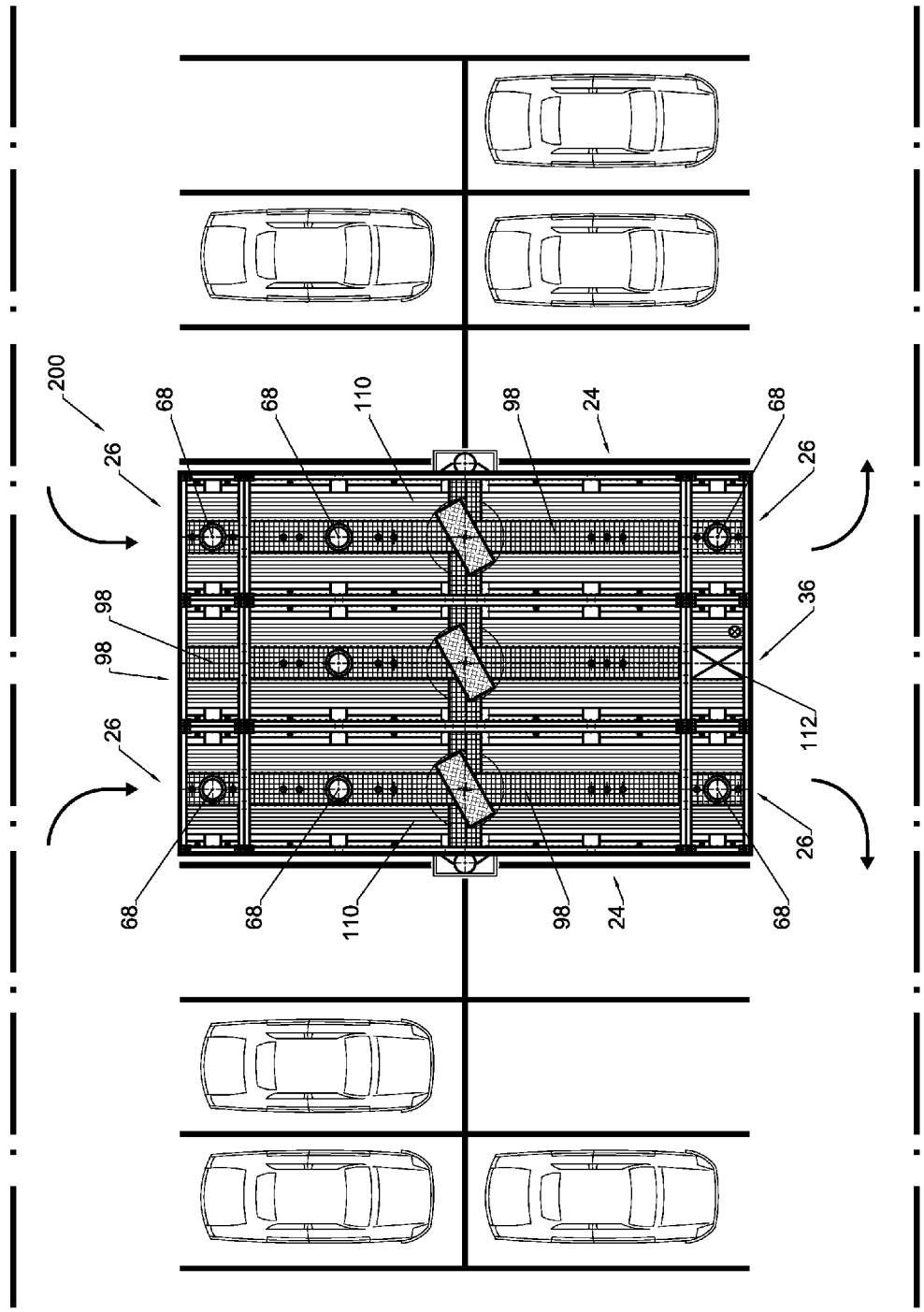
FIG. 33 is a top plan view of the three-tank mobile fuel distribution station of FIG. 32.
Figure 34:
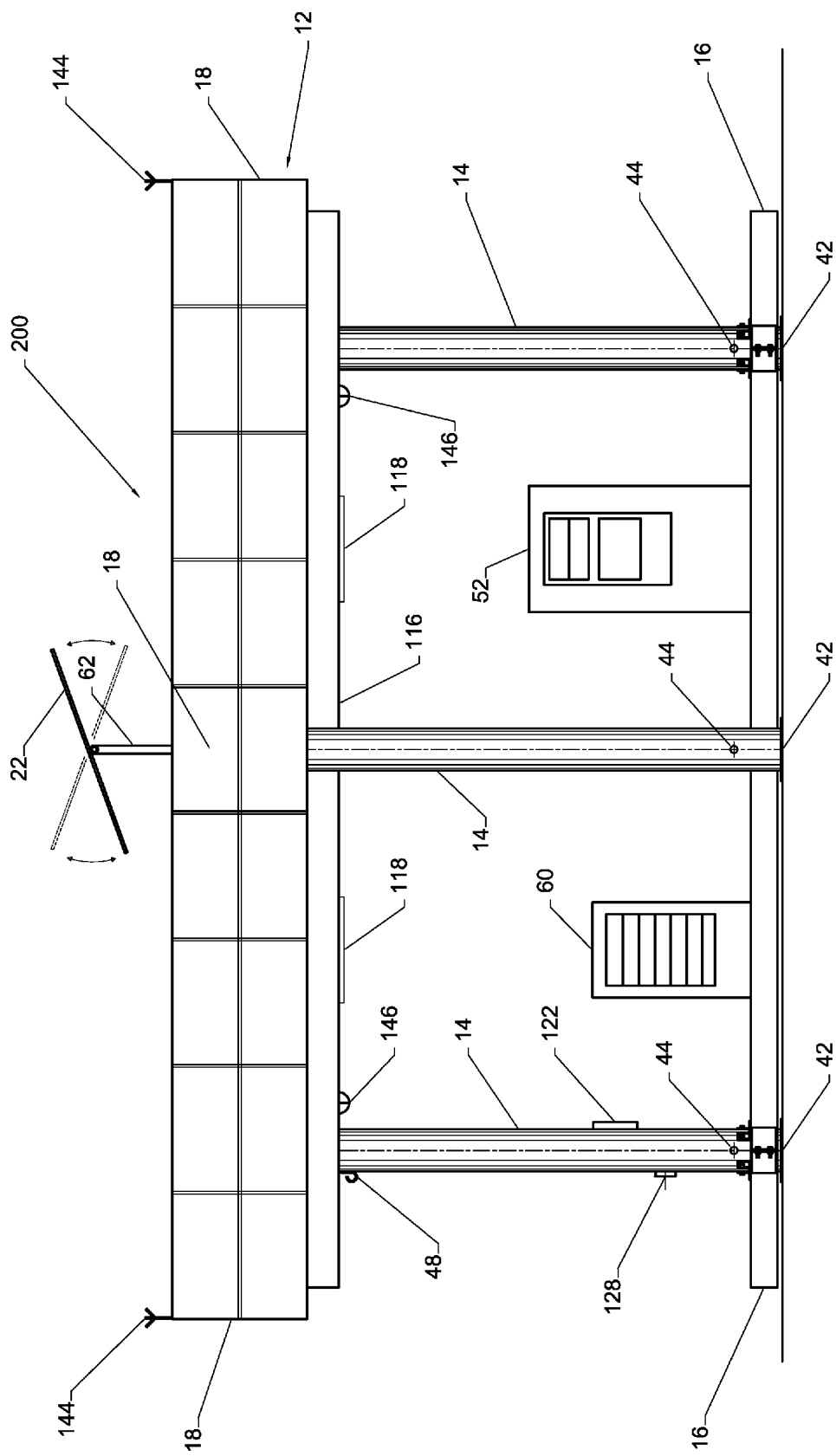
FIG. 34 is a front elevational view of the three-tank mobile fuel distribution station of FIG. 32.
Figure 35:
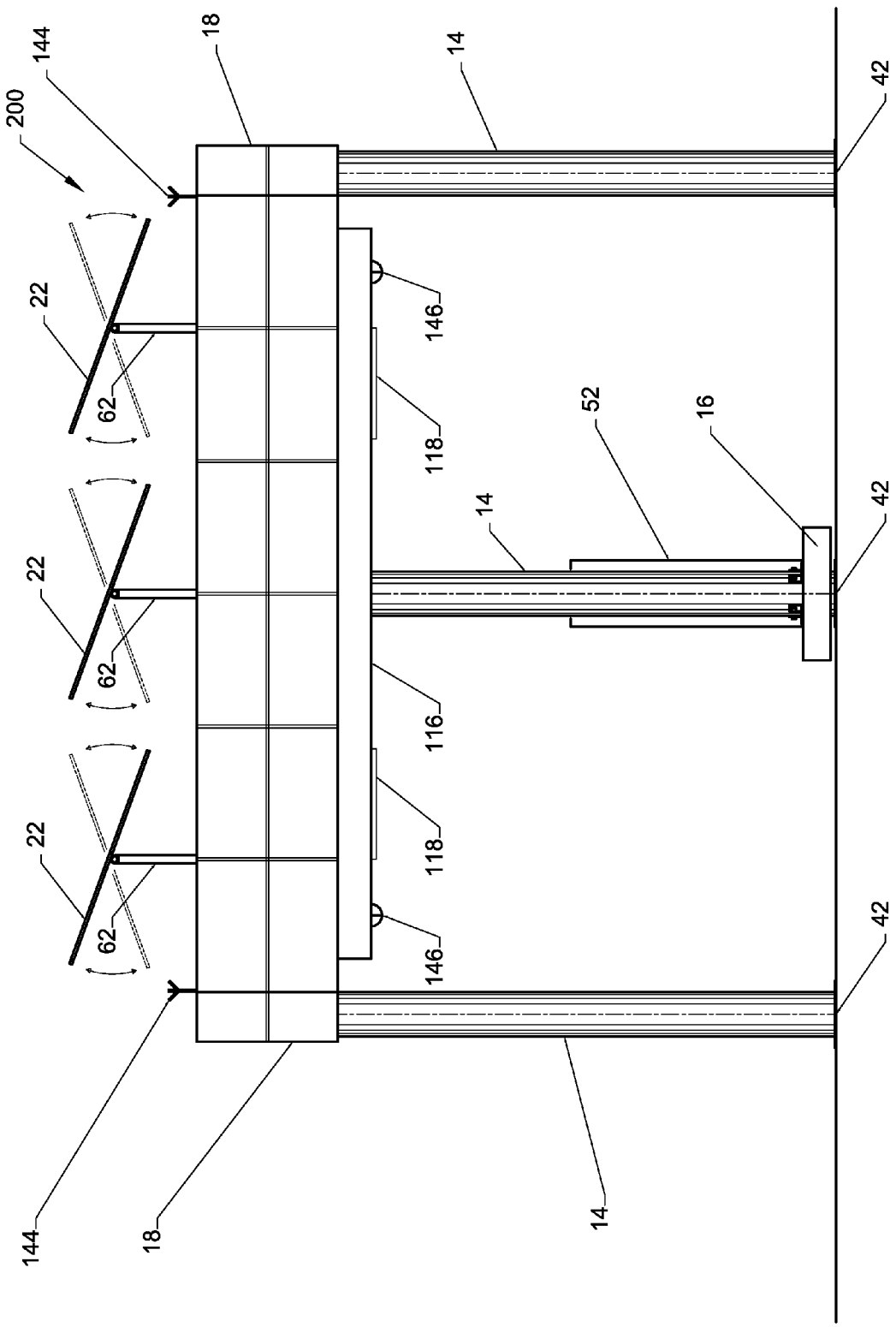
FIG. 35 is an end elevational view of the three-tank mobile fuel distribution station of FIG. 32.

FIGS. 32-35 show a three-tank mobile fuel distribution station 200 installed in the footprint of 6 spaces for automotive vehicles in a parking lot. As best shown in FIG. 33, the station 200 is the same as the basic station 10 disclosed above, but includes an additional main container assembly 24 and two additional auxiliary container assemblies 26. The additional main container assembly 24 is fixedly secured to one of the other main container assemblies 24 by way of the integral mounting brackets 32 described above. Moreover, the additional auxiliary container assemblies 26 are also fixedly secured to the additional main container assembly 24 and the adjacent equipment room assemblies 36 in the manner described above. As best shown in FIG. 32, the three-tank module 200 uses two of the leg supports 24 of the basic station 10. An additional leg 14 is fixedly attached to the added main tank 28 in the manner described above to provide added support to the station 200. As shown therein, four legs 14 (two tall legs and two short legs) support the three main tank assemblies 24, four auxiliary container assemblies 26 and two equipment room assemblies 28 in an elevated position. Linkage elements 20 adjacent the ground, as described above, are used to connect the support legs 14 to one another to provide additional rigidity and support. As shown in FIG. 35, a third solar panel 22 is also included to generate additional power for powering the station 200.

As will be readily appreciated, the configuration of the container assemblies 24,26,36 and the basic station 10 as a whole permits additional container assemblies, to be easily "stacked" together to create a mobile fuel distribution station of any desired size. In particular, additional container assemblies/modules may, themselves, be considered a secondary operation platform that can be fixedly attached to the first operation platform to create a larger station capable of offering additional fuel type. Indeed, this configuration allows additional container assemblies 24,26,36 (secondary operation platform) to be integrated together with the first operation platform by sharing one or more support legs 14 to thereby expand fuel storage capacity and the number of positions for fuel distribution, as desired.

Figure 36:
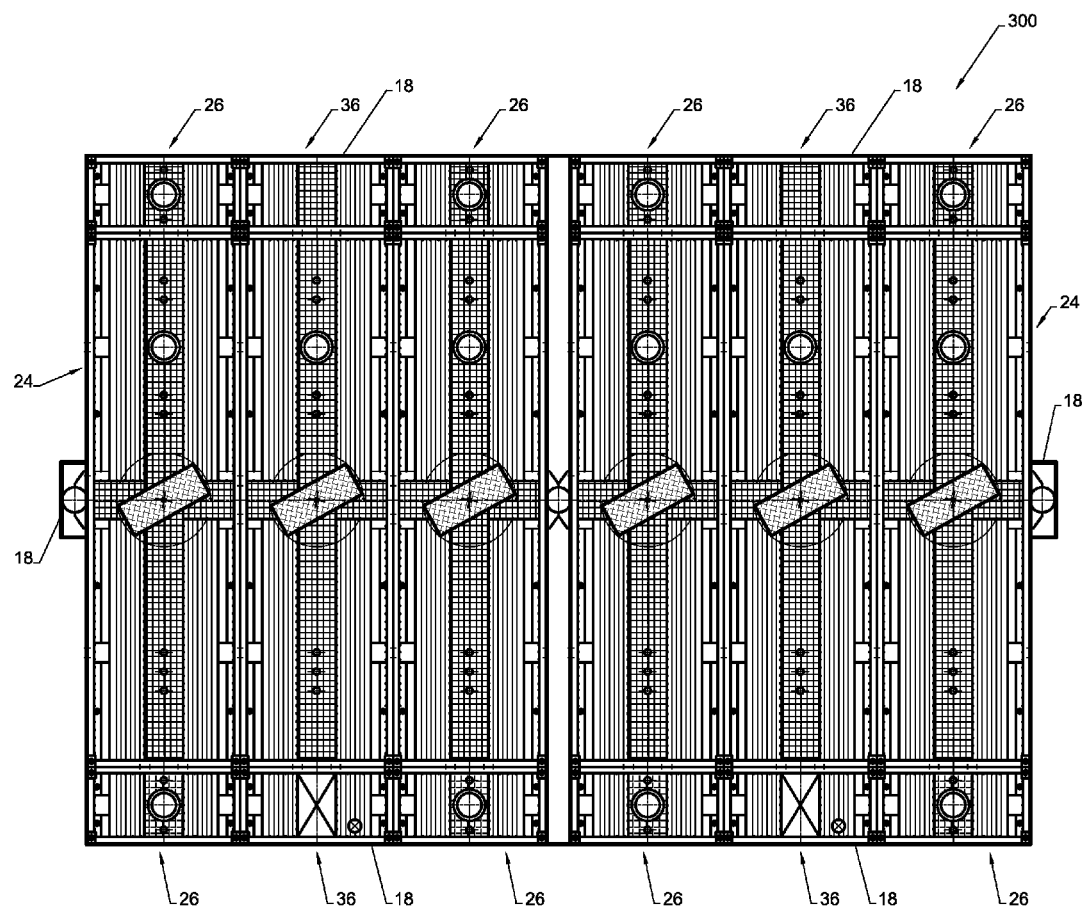
FIG. 36 is a top plan view of a six-tank mobile fuel distribution station in accordance with one embodiment of the present invention.
Figure 37:
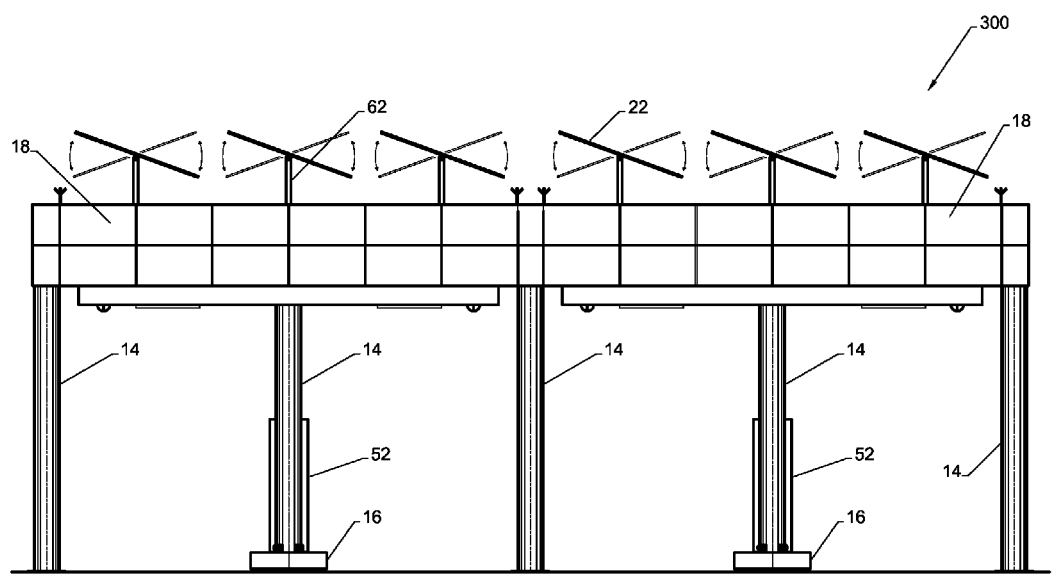
FIG. 37 is an end elevational view of the six-tank station fuel distribution station of FIG. 36.

An example of a larger mobile fuel distribution station is shown in FIGS. 36 and 37. In particular, FIGS. 36 and 37 show a mobile fuel distribution station 300 having six main container assemblies 24, eight auxiliary container assemblies 26 and four equipment room container assemblies 36 is shown. As shown therein, additional container assemblies are added to the basic mobile fuel distribution station 10 discussed above wherein each added group of container assemblies shares at least one common support leg 14 with another. As will be readily appreciated, once installed, or during installation, the mobile fuel distribution module/station 300 can be oriented in almost any direction depending on the space, direction of parking spaces, etc.

Figure 38:
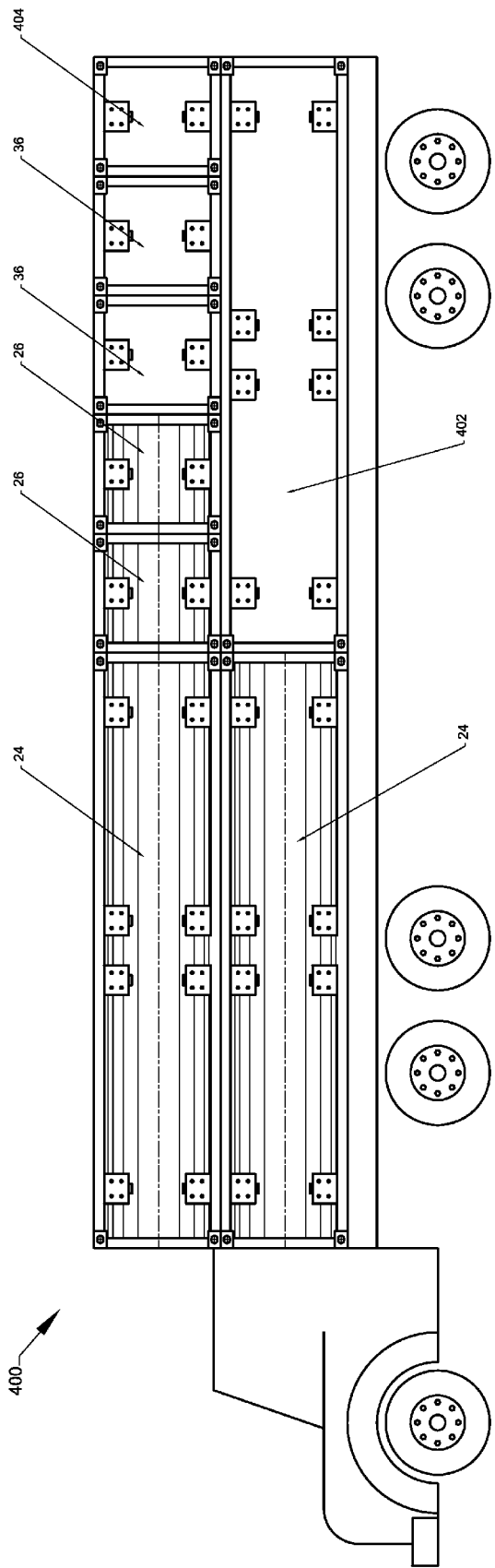
FIG. 38 illustrates a packing configuration of the mobile fuel distribution station of FIG. 1, for transportation in a semi-trailer truck.

The fact that the main tanks 28, auxiliary tanks 34 and equipment rooms 36 are formed as substantially rectangular container assemblies 24,26,36 having a frame 30 and mounting brackets 32 is an important aspect of the present invention. As will be readily appreciated, these container assemblies 24,26,34 can be manufactured and assembled, in whole or in part, prior to final assembly at the desired distribution location. Moreover, as shown in FIG. 38, all of the components for a basic mobile fuel distribution module 10 can fit into a single standard tractor-trailer truck 400. Likewise, all of the components can fit into a single cargo container for transportation by ship anywhere in the world. In connection with this, each of the container assemblies is designed in accordance with industry standards for preparing and transporting cargo. In particular, in the preferred embodiment, the basic station 10, for shipping purposes, includes:

1) 2-20' main container assemblies 24
2) 2-4' auxiliary container assemblies 26
3) 2-4' equipment room container assemblies 36
4) 1-20'×4'3"×8' container 402 (to transport all remaining components, e.g., fuel dispensers, hoses, piping, legs, central platform, lamps, modular panels, etc.)
5) 1-4' container 404 (to transport additional accessories)

Accordingly, this design allows for each mobile fuel distribution station 10 to be at least partly assembled at a plant or manufacturing location and then shipped, via a single standard 40' long shipping/cargo container, anywhere in the world. Once the container arrives on location, the main container assemblies 24, auxiliary container assemblies 26 and equipment room container assemblies 36 can be joined together via the mounting brackets 32, the legs 14 installed, and the equipment interconnections including piping, hoses, electrical wires, etc. run to and from the various components to provide a functioning station 10. In contrast to known fueling stations, which take weeks, months or even years to complete, the mobile fuel distribution station 10 of the present invention can be assembled on site within 2-3 days. As will be readily appreciated, however, the more assembly of components that is done off-site prior to arriving at the installation location, the quicker the station can ultimately be assembled. Accordingly, the fact that the modules/assemblies of the mobile fuel distribution station 10 are designed in accordance with industry standards for preparing and transporting cargo allows for the construction of a mobile on-demand fueling station 10 anywhere in the world.

If larger fueling stations are desired, multiple container assemblies 24,26,36 can be joined in the manner described above. By way of example, if (100) basic mobile fuel distribution stations 10 are needed, (200) 20' main container assemblies 24, (800) 4' engine room container assemblies 26,36 (with the equipment needed already installed), 200 long legs, 100 short legs, 100 central platforms 16, 2200 4'×8' modular panels 18, 200 4'×4' modular panels 18 and 400 1'×4' modular panels 18 are needed. If the 100 mobile fuel distribution stations 10 are going to 100 different installation locations, then one truck 400 per location is needed. As will be readily appreciated, for double stations, two trucks 400 are need, etc.

The ability to quickly and easily transport and construct a mobile fuel distribution station is an important aspect of the present invention, as discussed above. To construct the station 10, components of the station 10 are arranged in separate modules, such as the container assemblies 24,26,36,402,404 described above. The modules are then transported to a predetermined assembly location wherein they are unloaded. The container assemblies/modules 24,26,36 are then releasably connected together via the frame assemblies 30 to form an operation platform 12, and the operation platform 12 is then elevated on a support structure comprising a plurality of legs 14. The support structure is equipped with a wheel assembly 132 to permit movement or rotation of the station 10, as discussed above. Additional components such as an alternative power generation device, a hydrocarbon refining apparatus, armored panels and a central platform 16 may be secured to the station 10, as described above. Importantly, a natural gas compression apparatus and associated equipment, such as a compressor, etc., for compressing natural gas so as to be suitable for vehicle use may also be configured within one of the modules of the operation platform 12 during or prior to final assembly of the station 10, as discussed in an embodiment below, to provide for the distribution of compressed natural gas to compatible vehicles.

Figure 39:
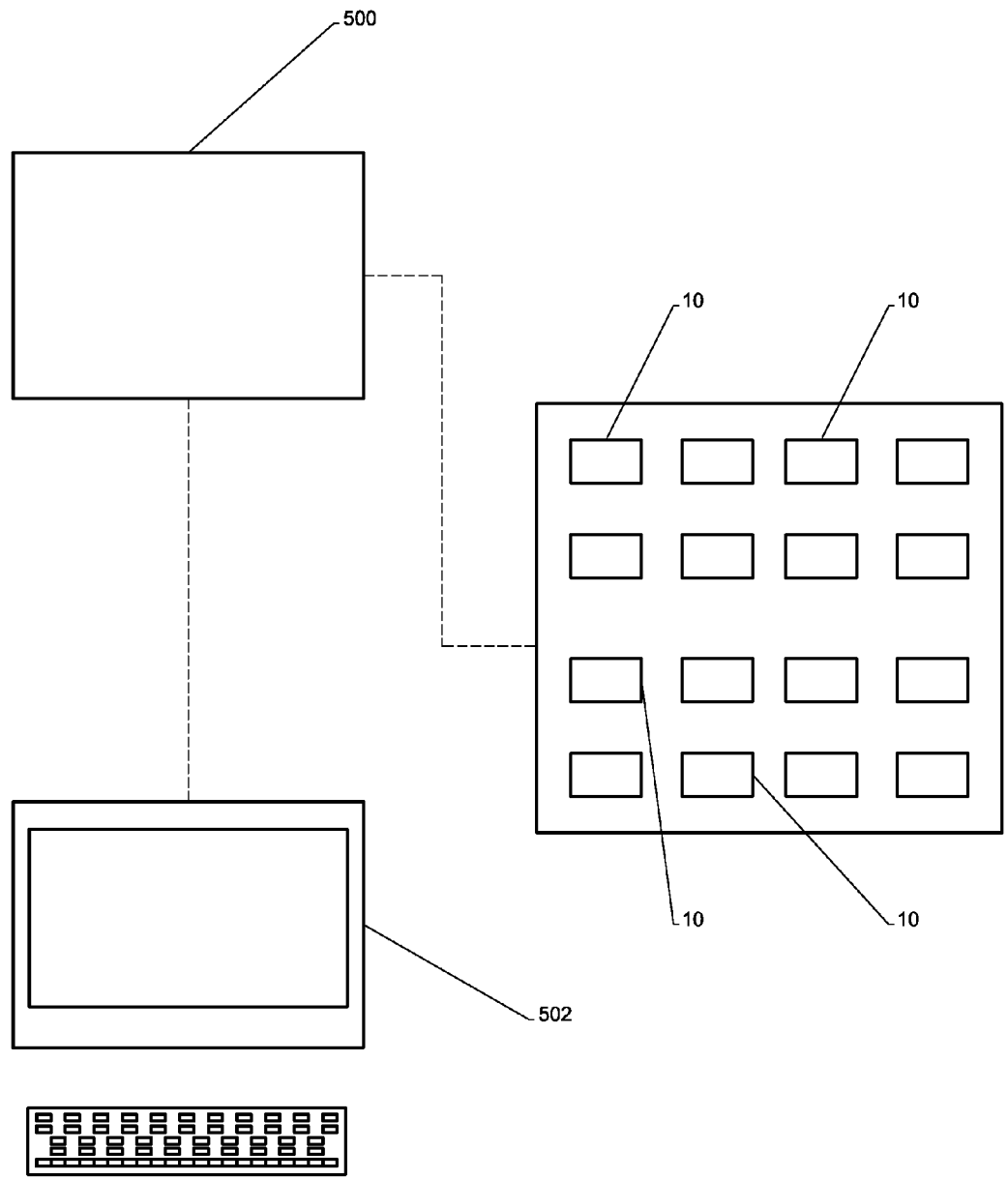
FIG. 39 is a schematic diagram of a command center for monitoring a plurality of mobile fuel distribution stations, in accordance with one embodiment of the present invention.

As alluded to above, the mobile fuel distribution station 10 of the present invention may be one station 10 in an interconnected network of stations that are monitored by a command center 500. As will be readily appreciated, data, images and the like collected by various sensors, cameras and fuel dispensers 52 at each station 10 can be transmitted to a remote command center 500 by the satellite antenna 148 associated with each such station 10. As shown in FIG. 39, the command center 500 is remotely staffed by at least one person who monitors numerous mobile fuel distribution modules/stations 10 through a computer interface 502 or the like. Each mobile fuel distribution station 10 is patched into the command center 500 through a wireless connection such as the satellite antenna 148. In this respect, the command center 500 can monitor numerous mobile fuel distribution stations 10 at once and coordinate fuel deliveries when fuel level is low, approve or decline credit card or debit card transactions, and alert attendants or police if suspicious behavior or tampering is detected on the video cameras 146. In addition, an automatic shut off system can be activated from the command center 500 in the event of emergencies. In connection with this, the satellite antenna 148 also allows the station to receive data and communications from outside sources, such as the command center 500.

As disclosed above, the mobile fuel distribution station 10 of the present invention provides a number of distinct advantages over known fueling stations. Importantly, as noted above, the mobile fuel distribution station is manufactured, at least in part, at an off-site facility and assembled on site through the use of nuts and bolts. In this respect, the mobile fuel distribution station can be easily and quickly assembled on site in a much shorter amount of time than is the case with known fueling stations. In the event that the station ceases operation, it can also be quickly and easily disassembled, leaving almost no indication that it was ever there. Moreover, because of this modularity, the mobile fuel distribution station can be easily and quickly moved from one location to another. In addition, because the module is self-contained, i.e., nothing is located below the ground and it operates on an alternative energy source such as a solar panel or wind power, a minimum number of pipes and wiring is required and no public works are required for its installation. Indeed, because the station is self-sufficient and does not use mechanical, hydraulic and other pumps to dispense fuel, it requires minimum power for its operation, which enables the use of solar panels or other sources of alternative energy.

Another important aspect of the present invention is the ability of the mobile fuel distribution module to operate as a stand-alone unit. As noted above, the module relies almost entirely on solar, wind or other alternative energy source for power and is ordinarily not connected to the main electrical grid. In this respect, it can be quickly and easily assembled in remote locations to meet fuel demand. Of course, auxiliary connection to the main electrical grid can be effectuated, if desired, without departing from the broader aspects of the present invention.

While it has been disclosed that the mobile fuel distribution station stores and dispense gasoline to the public, the present invention is not limited to storing and dispensing only gasoline. It is envisioned that the tanks of the mobile fuel distribution station can store and dispense any type of fuel including, but not limited to, fossil fuels, biofuels, hydrogen and methanol, whether liquid or gas including, but not limited to, liquefied petroleum gas and compressed natural gas. In addition, especially in the broader aspects of the present invention wherein multiple-module fueling stations are contemplated, a single fueling station can store and dispense multiple types of fuel, such as gasoline, hydrogen, methanol, electricity, etc. In this embodiment, a customer must merely select the type of fuel required for his/her vehicle and the fuel will be dispensed from the appropriate fuel storage tank. Moreover, other auxiliary container assemblies can hold containerized equipment such as generators, air pumps, battery banks, solar panels, fire fighting equipment, electronic equipment or equipment to perform other processes or tasks. As disclosed above, each of the container assemblies can be assembled to one another in different configurations to form a flexible and modular fuel station, thereby offering a flexibility heretofore not seen in the art.

Importantly, as discussed above, the mobile fuel distribution station of the present invention obviates many of the environmental concerns associated with known fueling stations. Because the station can quickly and easily be assembled on site, no public works or complex plans need to be commissioned. In addition, the station of the present invention does not involve any excavation or disturbing of the underlying soil, as the tanks are elevated above the ground and the station rests on the support legs and the shoes. As such, in the event that the station is no longer needed, demand has waned or the property is abandoned, the station may be dismantled in the same manner in which it was constructed. As will be readily appreciated, no tanks need to be dug up and no concrete will remain in the ground, as would be the case with known fueling stations. Accordingly, the station may be easily removed leaving no indication that it ever existed. In addition, because of the elevated design of the mobile fuel distribution station, the risk of fuel seepage into the soil due to a spill or a leak in the tank is greatly minimized. In this respect, the property may be sold easier and with many less restrictions than would otherwise be the case.

In addition to its minimal physical footprint, the mobile fuel distribution station of the present invention also has a very small environmental footprint, as compared to known fueling stations. As will be readily appreciated, by positioning the fuel tanks in an elevated position, they are out of reach of patrons of the station but still easily accessible for inspection and maintenance. This is in stark contrast to known fuel distribution stations having tanks buried in the ground, as any inspection and maintenance of such tanks often requires shutting down the entire station and digging up the tanks. As such, elevating the tanks in a secure location above the ground is much more environmentally friendly and allows for easier servicing and maintenance.

Moreover, as disclosed above, the location of the tanks above the dispensers and the use of gravity to dispense fuel obviate the need for any pumps. As no pumps are required to dispense the fuel from the tanks, a very low investment in hydraulic and electrical installations is necessary. Indeed, by using gravity as the motive force to dispense liquid fuels, much less power is used as compared to known fueling stations that use mechanical pumps with a substantial electrical power draw. Accordingly, the mobile fuel distribution station of the present invention is much more efficient and saves a large amount of energy. Additionally, the location of the tanks above the ground makes them less likely to corrode, and even when leaks are present, they are much easier to detect than if the tanks were buried within the earth. As such, the likelihood of contaminating the subsoil is all but eliminated.

In addition, the station uses an alternative energy source such as a solar panel or wind turbine (or a combination of both) and battery bank to power components as lights, credit/debit card machines and the like. A small electrical fossil fuel generator is only included for backup power, and in many cases the station may be entirely off the electrical grid. Moreover, by forming station such additional tank container assemblies can be added, large fueling stations of almost any size and configuration can be assembled at a low cost, with minimum effort and with reduced materials.

While the preferred embodiment contemplates separate container assemblies for housing the main tank, auxiliary tank and equipment, respectively, in an alternative embodiment a single container assembly, defined by an outer frame structure, may be used to house the main fuel storage tank or tanks, the auxiliary fuel storage tank or tanks, as well as any equipment necessary for the operation of the module. Moreover while the disclosure above uses the terms "main container assembly," "auxiliary container assembly," and equipment room container assembly," these assemblies can likewise be considered "modules." In any event, it is contemplated that these assemblies/modules can be mixed and matched to provide any level of customization desired. In particular, the mobile fuel distribution module of the present invention can include any number of main container assemblies, any number of auxiliary container assemblies, and any number of equipment room container assemblies depending on the specific projected or actual fuel demands of a particular location. As will be readily appreciated, the modular characteristics of the assemblies allow for them to simply be attached or detached from the station as desired such that the basic station can be expanded or contracted to meet fueling and equipment demands.

In consideration of the preceding design of the mobile fuel distribution module, the rectangular frame structure 30 of the main tank assembly 24, auxiliary tank assembly 26 and equipment room assembly 36 not only provides a superstructure to mount and house fuel tanks and other equipment necessary for operation of the module, but also provides a number of additional advantages. In particular, the rectangular shape and configuration of the assemblies/containers 24,26,36 allows these assemblies to be easily, stored, stacked, transported and assembled. Indeed, the modular nature of the assemblies allows almost any equipment, storage tanks or other components to be mounted therein, either on site or, preferably, prior to arriving at the installation site. As will be readily appreciated, this flexibility of configuring and mounting most components within the assemblies prior to shipping minimizes on-site assembly and installation time. Moreover, the assemblies themselves are modular in that broken or faulty equipment, or indeed an entire assembly 24,26,36, can be quickly and easily swapped out from the station such that any down time is minimized. In addition, each assembly can be configured with the specific equipment and components necessary for operation of the module depending on the type of fuel offered; additional assemblies 24,26,36 can also be added to expand the station to keep up with increasing demand or to support a new or alternative type of fuel (including adding an assembly(s) having storage tanks and any fuel conversion equipment required for any given fuel type, as detailed below).

Figure 40:
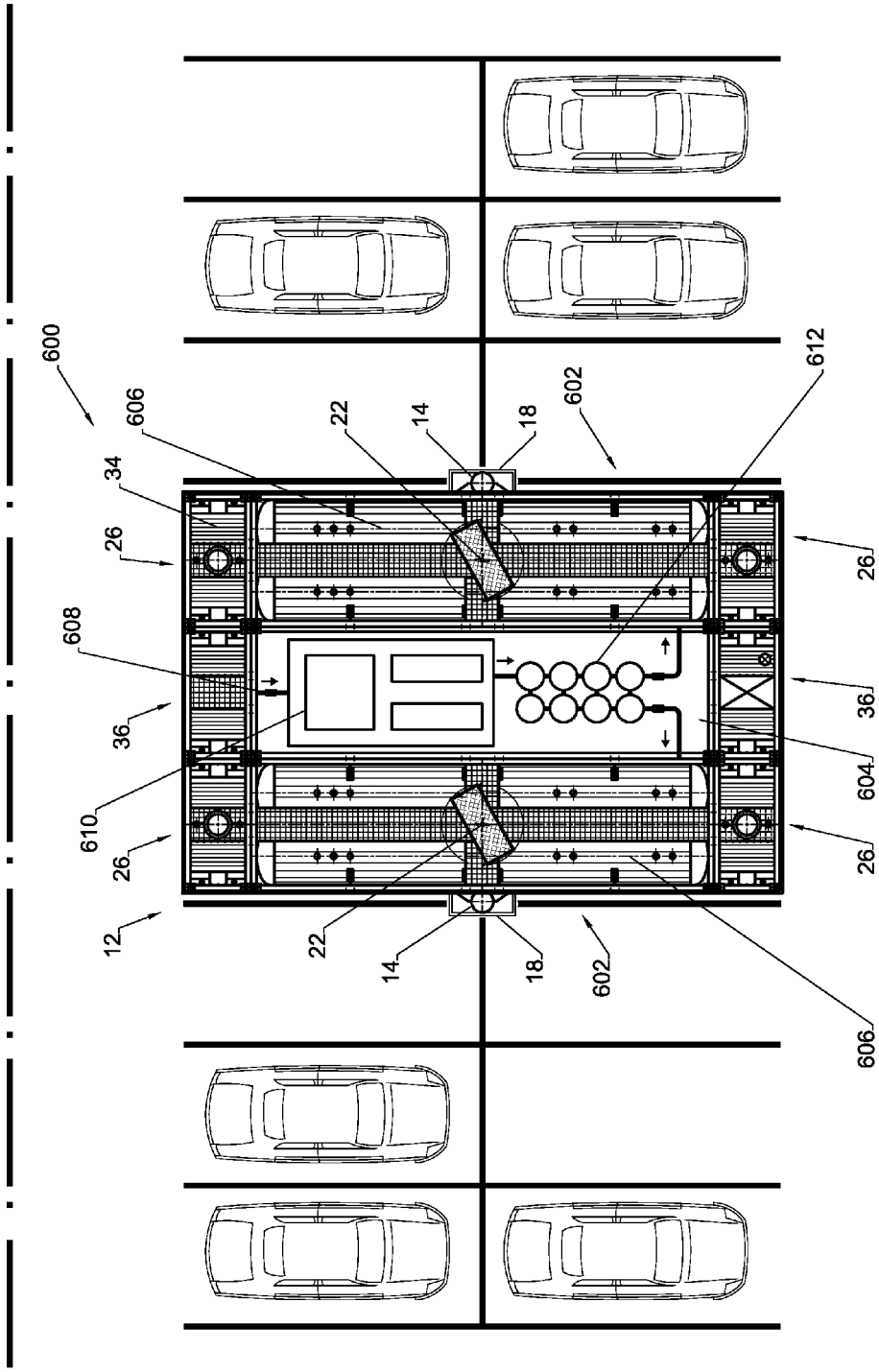
FIG. 40 is a schematic diagram (top plan view) of a mobile fuel distribution station configured for delivering compressed natural gas in accordance with one embodiment of the present invention.

In yet another embodiment, a mobile fuel distribution station 600 for delivering compressed natural gas (CNG) to vehicles is provided. As shown in FIG. 40 the station 600 is substantially similar in its construction to the station 300 shown in FIGS. 33-35, with a few notable differences. In particular, the station 600 generally includes a generally rectangular operation platform 12, a plurality of legs 14 that support the operation platform 12 in an elevated position above the ground and a central platform 16 (not shown) that provides a service interface for patrons of the station 10. The operation platform 12 is covered by a plurality of modular panels 18 that function to both block from view, and protect, the main functional components of the station 10 housed within the operation platform 12, as discussed above. In this embodiment, preferably four legs support the operation platform 12 in an elevated position, although a support structure having more than four legs is also possible without departing from the broader aspects of the present invention. As with the station 200 of FIGS. 33-35, the mobile fuel distribution station 600 further includes at least one alternative power generation device, such as one or more solar panels 22, supported in an elevated position by the legs 14. The solar panels 14 are tiltable and rotatable 360 degrees to collect and convert sunlight to electricity to provide power to the mobile fuel distribution station 600.

Figure 41:
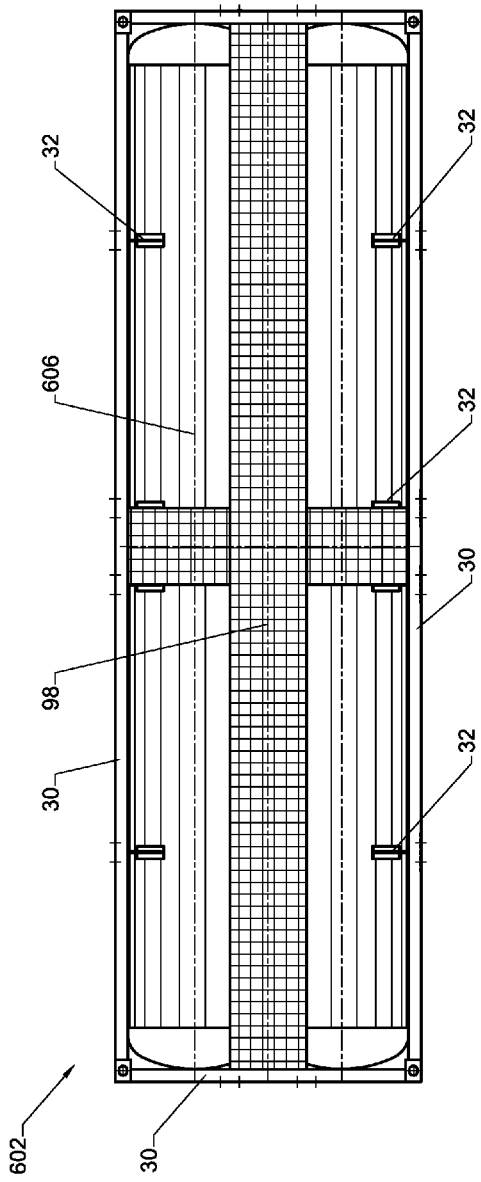
FIG. 41 is a top plan view of a CNG container assembly of the mobile fuel distribution station of FIG. 40.
Figure 42:
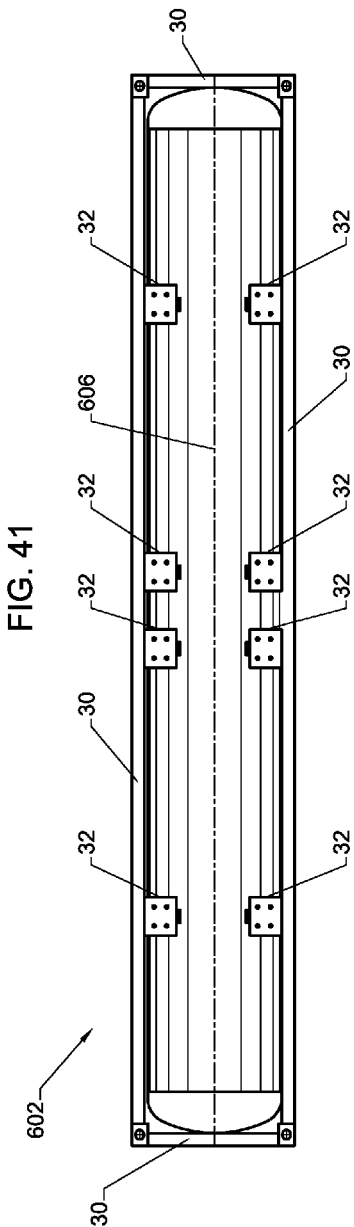
FIG. 42 is a side elevational view of the CNG container assembly of FIG. 41.
Figure 43:
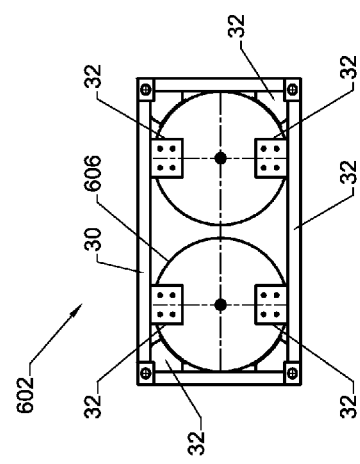
FIG. 43 is an end elevational view of the CNG container assembly of FIG. 41.

In contrast to the station 200, however, the station 600, includes two CNG container assemblies and one large equipment room assembly 604 mounted therebetween. Detail views of the CNG container assemblies 602 are best shown in FIGS. 41-43. As shown therein, each CNG container assembly 602 includes two substantially cylindrical compressed natural gas storage tanks 606 positioned side by side and mounted within a generally rectangular frame 30. Preferably, the frame 30 is the same or substantially similar to the frame 30 disclosed above in connection with the main container assembly 24. Optionally, the CNG container assemblies 602 may be enclosed by walls (not illustrated). Preferably, the tank 606 is cylindrical in cross section, although tanks of other shapes and types are certainly possible without departing from the broader aspects of the present invention.

Importantly, the tank 606 and the frame 30 surrounding the tank 606 are configured with mounting brackets 32 for attaching various container assemblies together, for attaching the legs 14 to the container assemblies, as discussed above, so that the tanks 606 can be supported in an elevated position, and for mounting the modular panels 18, as also discussed above. In the preferred embodiment, at least some of the mounting brackets 32 are integrally formed with, welded to or otherwise directly fastened to the CNG tanks 606. As shown in FIGS. 6-8, each longitudinal side of the main storage tank 28 preferably has four pairs of mounting brackets 32 and each lateral side has two pairs of mounting brackets 32, although more or fewer mounting brackets arranged in any configuration may be used without departing from the broader aspects of the present invention.

As further shown in FIG. 40, the CNG container assemblies 602 are rigidly affixed to opposing longitudinal sides of the large equipment room container assembly 604 by the mounting brackets 32. As shown therein, the equipment room container assembly 604 includes a low pressure gas intake 608, a natural gas compression apparatus, such as a slow fill gas compressor 610, in fluid communication with the low pressure gas intake 608, and process equipment 612 for further altering the natural gas and maintaining the natural gas at a predetermined, constant temperature, so as to be suitable for vehicle use. In operation, natural gas is supplied by a fuel truck or, more preferably, directly from a main natural gas pipeline (e.g., a main natural gas pipeline available on city streets) to the low pressure gas intake 608. The supplied gas is then routed by a conduit to the slow fill gas compressor 610 which compresses the natural gas to a predetermined pressure. The compressed gas is then routed through process equipment 612 and ultimately to the CNG storage tanks 606 where it is stored and maintained at approximately 3600 psi. As will be readily appreciated, the compressed natural gas stored in the tanks 606 may be dispensed on demand by patrons of the module through a dispenser (not shown).

As further shown in FIG. 40, the station 600 may also include auxiliary container assemblies 26 having an auxiliary fuel storage tank 34 to provide additional fuel capacity or other types of fuel. The station 600 may further include equipment room container assemblies 36, such as those described above, for housing other equipment necessary for the proper functioning of the module, such as control circuitry, the fossil fuel generator and the like.

Importantly, while the station 600 is configured to dispense compressed natural gas to vehicles, the station 600 may be modified to dispense other fuels in addition to CNG. In particular, main container assemblies 24 having a main fuel storage tank 28 for storing other fuels such as diesel, gasoline, liquefied petroleum, methanol, etc., may be rigidly attached to the sides of the station 600 (and more legs 14 added to provide additional support, if necessary, as disclosed above). In this manner, the station 600 can be configured to offer a variety of fuel types, in addition to CNG.

Figure 44:
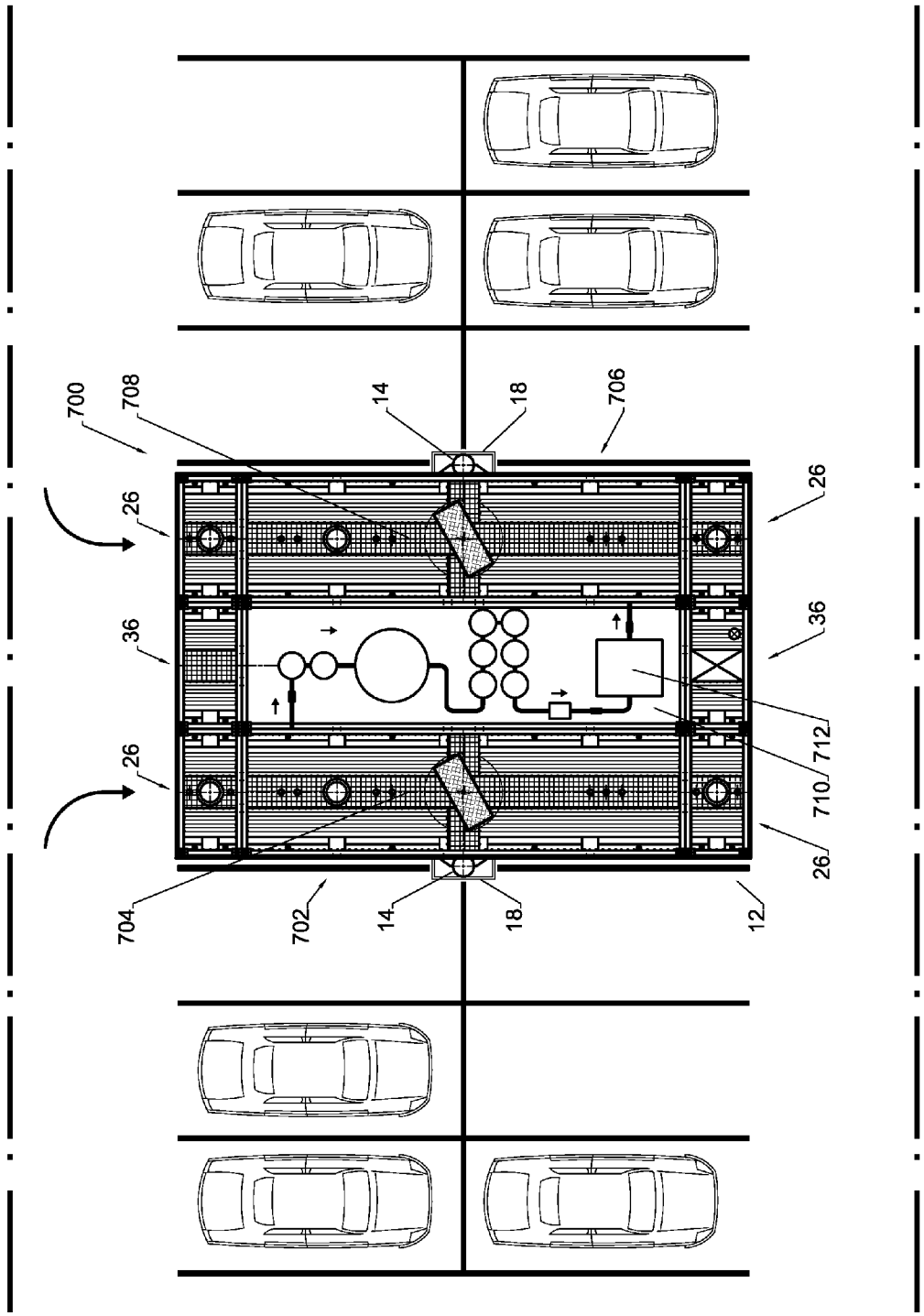
FIG. 44 is a schematic diagram (top plan view) of a mobile fuel distribution station for delivering hydrogen fuel in accordance with one embodiment of the present invention.

Yet another embodiment of the present invention provides for the distribution of secondary hydrocarbon materials, preferably hydrogen, to compatible vehicles. As used herein, secondary hydrocarbon material means any material that has been refined or produced from an upstream, primary hydrocarbon material including but not limited to gasoline, diesel, natural gas, etc. As shown in FIG. 44, the mobile fuel distribution station 700 according to this embodiment is substantially similar to the station 600 shown in FIG. 40, with a few notable differences in the main tank and main equipment room assemblies. In particular, the station 700 generally includes a generally rectangular operation platform 12, a plurality of legs 14 that support the operation platform 12 in an elevated position above the ground and a central platform 16 (not shown) that provides a service interface for patrons of the station 10. The operation platform 12 is covered by a plurality of modular panels 18 that function to both block from view, and protect, the main functional components of the station 10 housed within the operation platform 12, as discussed above. In this embodiment, preferably four legs support the operation platform 12 in an elevated position, although a support structure having more than four legs is also possible without departing from the broader aspects of the present invention. As with the station 600 of FIG. 40, the mobile fuel distribution station 700 further includes at least one alternative power generation device, such as one or more solar panels 22, supported in an elevated position by the legs 14. The solar panels 14 are tiltable and rotatable 360 degrees to collect and convert sunlight to electricity to provide power to the mobile fuel distribution station 700.

As shown in FIG. 44, the station 700 includes a first main container assembly 702 having a primary hydrocarbon material storage tank 704 and a second main container assembly 706 having a secondary hydrocarbon material storage tank 708 disposed on said operation platform 12. Preferably, the construction of the container assemblies 702,706 is similar to the construction of the main container assembly 24, disclosed above. A large equipment room container assembly 710 is mounted between the first main container assembly 702 and second main container assembly 706 and is rigidly fastened thereto using mounting brackets 32, as discussed above. As shown therein, the large equipment room container assembly 710 houses a hydrocarbon refining apparatus 712 for selectively accepting the primary hydrocarbon materials from the storage tank 704 and for cracking and refinement into secondary hydrocarbon materials for storage in the storage tank 708. The hydrocarbon refining apparatus may include a pump, filters, etc. In operation, the primary hydrocarbon material stored in the tank 704 is directed through the refining apparatus 712 housed within the large equipment room 710 and is cracked, refined, and stored as a secondary hydrocarbon material in the storage tank 708. As will be readily appreciated, the primary hydrocarbon materials may include, but are not limited to, gasoline, natural gas, etc. In the preferred embodiment, the primary hydrocarbon material is natural gas and the secondary "hydrocarbon" material is hydrogen suitable for vehicle use. As will be readily appreciated, the refined hydrogen stored in the tank 708 may then be dispensed on demand by patrons of the module through a dispenser (not shown) located on the central platform (not shown).

As further shown in FIG. 44, the station 700 may also include auxiliary container assemblies 26 having an auxiliary fuel storage tank 34 to provide additional fuel capacity or other types of fuel. The station 700 may further include equipment room container assemblies 36, such as those described above, for housing other equipment necessary for the proper functioning of the module, such as control circuitry, the fossil fuel generator and the like.

Importantly, while the station 700 is configured to dispense hydrogen gas, or other secondary hydrocarbon materials, to vehicles, the station 700 may be modified to dispense other fuels in addition to CNG. In particular, main container assemblies 24 having a main fuel storage tank 28 for storing other fuels such as diesel, gasoline, methanol, liquefied petroleum, etc., may be rigidly attached to the sides of the station 700 (and more legs 14 added to provide additional support, if necessary, as disclosed above). In this manner, the station 700 can be configured to offer a variety of fuel types, in addition to hydrogen.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A non-aerial, mobile fuel station for providing fuel to land-based vehicles, comprising:
   a fuel tank;
   a support structure for supporting said fuel tank in an elevated position a predetermined distance above ground sufficient to allow for passage of automobiles beneath said fuel tank; and
   a moving mechanism associated with said support structure;
   wherein said moving mechanism is selectively movable between a retracted position in which said support structure contacts said ground and supports said fuel tank in said elevated position, and an engaged position in which said moving mechanism contacts said ground to raise said support structure a given distance above said ground to facilitate movement of said fuel station.

2. The non-aerial, mobile fuel station for providing fuel to land-based vehicles according to claim 1, wherein:
   said support structure is three rigid legs.

3. The non-aerial, mobile fuel station for providing fuel to land-based vehicles according to claim 2, wherein:
   said three rigid legs are arranged in a triangular orientation.

4. The non-aerial, mobile fuel station for providing fuel to land-based vehicles according to claim 1, wherein:
   said moving mechanism is a wheel assembly affixed to said support structure.

5. The non-aerial, mobile fuel station for providing fuel to land-based vehicles according to claim 1, further comprising:
   a control system for selectively permitting and monitoring a discharge of fuel from said mobile fuel station.

6. The non-aerial, mobile fuel station for providing fuel to land-based vehicles according to claim 2, further comprising:
   a central platform operatively connected to said support structure, said central platform including piping to transfer fuel discharged from said fuel tank.

7. The non-aerial, mobile fuel station for providing fuel to land-based vehicles according to claim 6, wherein:
   at least two of said legs bear an entire weight of said central platform.

8. The non-aerial, mobile fuel station for providing fuel to land-based vehicles according to claim 6, further comprising:
   a central platform operatively connected to at least two of said legs, said two of said legs bearing an entire weight of said central platform such that engagement of said wheel assembly selectively enables movement of said central platform and said mobile fuel distribution station.

9. A non-aerial, mobile fuel station for providing fuel to land-based vehicles, comprising:
   a fuel tank;
   exactly three rigid legs arranged in a triangular orientation for supporting said fuel tank in an elevated position a predetermined distance above ground sufficient to allow for passage of automobiles beneath said fuel tank; and
   a moving mechanism associated with said legs;
   wherein said moving mechanism is selectively movable between a retracted position in which said legs contact said ground and support said fuel tank in said elevated position, and an engaged position in which said moving mechanism contacts said ground to raise said legs a given distance above said ground to facilitate movement of said fuel station.

10. The non-aerial, mobile fuel station for providing fuel to land-based vehicles according to claim 9, further comprising:
   at least one distribution conduit housed within one of said three rigid legs for distributing fuel from said fuel tank to said automobiles beneath said fuel tank.

* * * * *